US011258746B1

(12) United States Patent
Nadig et al.

(10) Patent No.: US 11,258,746 B1
(45) Date of Patent: Feb. 22, 2022

(54) SETTING OVERRIDES

(71) Applicant: Amazon Technologies, Inc., Seattle, WA (US)

(72) Inventors: Vinaya Nadig, Redmond, WA (US); Sarang Anil Ozarde, Seattle, WA (US); Shawn Michael Banks, Issaquah, WA (US); King Lung Chiu, Seattle, WA (US); Nicholas Kalkouni, Toronto (CA); Brian Oliver, Seattle, WA (US); Anuj Kamra, Bellevue, WA (US); Iain Kennedy, Mercer Island, WA (US); Tu Dien Do, Kanata (CA); Adrien Montpellier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/388,307

(22) Filed: Apr. 18, 2019

(51) Int. Cl.
*H04L 12/58* (2006.01)
*H04L 29/08* (2006.01)
*H04M 1/72463* (2021.01)

(52) U.S. Cl.
CPC ............ *H04L 51/24* (2013.01); *H04L 51/043* (2013.01); *H04L 67/2833* (2013.01); *H04M 1/72463* (2021.01)

(58) Field of Classification Search
CPC ... H04L 51/24; H04L 51/043; H04L 67/2833; H04M 1/72577
See application file for complete search history.

(56) References Cited

U.S. PATENT DOCUMENTS

| 5,872,840 | A * | 2/1999 | Wu | H04M 3/436 379/197 |
| 7,996,476 | B2 * | 8/2011 | Geffner | G06Q 10/107 370/429 |
| 8,355,491 | B1 * | 1/2013 | Butt | H04M 3/436 379/210.02 |
| 8,909,203 | B1 * | 12/2014 | Hertzfeld | H04M 3/436 455/414.1 |
| 2005/0192039 | A1 * | 9/2005 | Xue | H04M 3/436 455/517 |
| 2005/0249023 | A1 * | 11/2005 | Bodlaender | H04M 3/53333 365/232 |
| 2010/0099398 | A1 * | 4/2010 | Bauchot | G06K 7/10079 455/422.1 |
| 2014/0241517 | A1 * | 8/2014 | Varoglu | H04L 51/24 379/201.01 |
| 2019/0281387 | A1 * | 9/2019 | Woo | G06F 3/165 |

* cited by examiner

*Primary Examiner* — Philip J Chea
*Assistant Examiner* — Robert B McAdams
(74) *Attorney, Agent, or Firm* — Kilpatrick Townsend & Stockton LLP

(57) ABSTRACT

Techniques for managing notifications to be presented by user devices are described. In an example, a computer system associates a first user account with a user device and stores first data indicating that a notification about a communications session via a communications network system is prohibited. The computer system receives a request associated with the first user account for communications with another device via the communications network system. Based at least in part on the other device, the computer system generates second data indicating that the notification about the communications session is to be presented within a period of time of the communications session being requested. The computer system associates the first user account with the second data.

20 Claims, 15 Drawing Sheets

SETTING OVERRIDES

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio and video communications with other devices.

BRIEF DESCRIPTION OF THE DRAWINGS

Various embodiments in accordance with the present disclosure will be described with reference to the drawings, in which.

DETAILED DESCRIPTION

Figure 1:
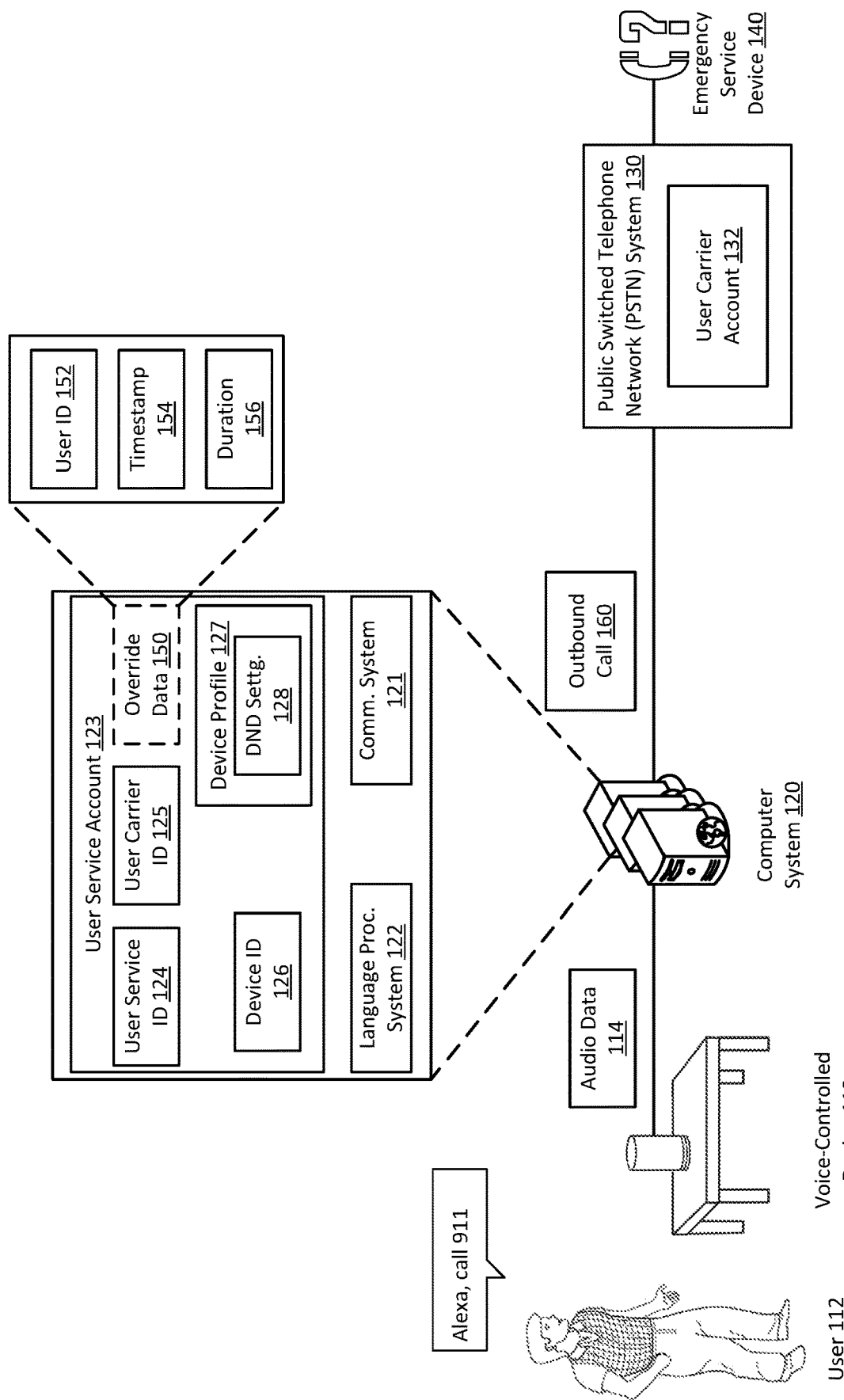
FIG. 1 illustrates an example network for outbound communications from a user device, according to certain embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to managing notifications to be presented by user devices. In an example, a user device is registered under a first user account with a service provider. A communications device is registered under a second user account with an operator of a communications network system. The second user account enables the communications device to establish communications sessions over the communications network system (e.g., the second user account is used to access the communications network system). Upon an association between the first user account with the second user account, the association enables the user device to similarly establish communications session over the communications network system. Further, setting data may be stored for the user device, where this setting data prohibits an output (e.g., a presentation) of a notification about a requested communication session with the user device. However, under certain conditions, outputting the notification may be desirable. Accordingly, override data may be stored to temporarily override the setting data, where the user device can be instructed to output (e.g. present) the notification when the conditions are met. For instance, the conditions can relate to an outbound communications session from the user device to a particular device (e.g. a computing device having a particular network destination) and to timing of an inbound communications session to the user device. In particular, upon the user device requesting the outbound communication session to the particular device, the override data is generated and indicates a period of time within which the setting data is to be overridden. If the inbound communications session is requested within the period of time, the user device can be instructed to output the notification, despite the setting data indicating otherwise. If the inbound communication is requested outside the period of time, the setting data is not overridden and the user device may not output the notification.

To illustrate, consider an example of a voice-controlled device (VCD) associated with a mobile device. The VCD can represent a smart speaker providing an intelligent personal assistant service responsive to a wakeword (e.g. "Alexa"). The VCD can be registered to a user under a first user account with a service provider of the VCD and/or of voice-related computing services available to the VCD. The mobile device can be registered to the user under a second account with a mobile carrier operating a public switched telephone network (PSTN) system. The first user account stores a device profile of the VCD that includes a do not disturb (DND) setting. In addition, the first user account is linked with the second user account to enable phone calls to and from the VCD via the PSTN system. For instance, the first user account can store a user service identifier (e.g., a unique identifier of the user with the service provider), a user carrier identifier (e.g., a unique identifier of the user with the mobile carrier), a contacts list from the second user account, authentication tokens, and access tokens, among other information. A computer system of the service provider stores the first user account and the device profile and manages the inbound and outbound communications session to and from the user device. In this way, the user can utter "Alexa, call John" to make a phone call via the PSTN system to a phone number associated with a contact stored as "John." A language processing system of the computer system determines the intent being an outbound phone call and the target being a contact named "John." A communications system of the computer system determines the destination address of the contact "John" based on the contacts list and routes the outbound communications based on the device identifier, the user service identifier, and the user carrier identifier. Similarly, by dialing the user's mobile number, a caller can make a phone call via the PSTN system to the user, where this inbound communications can be answered on the VCD. For instance, the communications system routes the inbound communications based on the device identifier, the user service identifier, and the user carrier identifier.

In this illustration, the DND setting can be updated under the device profile to indicate that a ringtone is not to be played when an inbound communications to the VCD is requested. However, when an outbound emergency call from the VCD is made (e.g., following a user utterance of "Alexa, call 911"), the communications system can generate and store override data in a database and associate the override data with the first user account. In this way, if subsequent inbound communications to the VCD are requested, the DND setting can be temporally overridden and the VCD can be rung to provide audible notifications to the user during a potential emergency situation. For instance, the override data identifies the first user account and indicates a validity time period during which the DND setting is to be overridden. In particular, the override data can include the user service identifier, a timestamp of the emergency call, and a predefined duration. Upon an inbound call, the communications system determines a difference between the timestamp from the override data and a timestamp of the inbound call and compares the difference to the predefined duration. If the difference is less than the predefined duration, the inbound call falls within the validity time period for overriding the DND setting. Accordingly, the communications system sends data to the VCD including instructions about playing the ringtone.

Embodiments of the present disclosure provide several technological advantages. For example, when a user account with a service provide is linked to a user account with a PSTN system operator, a DND setting may conflict with user notification requirements in emergency situations. By generating and using override data to manage the notifications in emergency situations, this conflict can be resolved. Because the user is notified of the incoming communications in a timely manner, the overall user experience can be improved.

In the interest of clarity of explanation, embodiments of the present disclosure are described in connection with phone calls associated with mobile carrier. However, the embodiments are not limited as such and similarly apply to any type of communications, whether synchronous or asynchronous communications and whether audio, video, multimedia, and/or text communications and to any communications network system, including landline and other types of networks.

In also the interest of clarity of explanation, the embodiments are described in connection with overriding a DND setting. The DND setting may inhibit the presentation of audible, visual, and/or tactile notifications (e.g., ringtone, light, and/or vibration). However, the embodiments similarly apply to overriding any other types of setting prohibiting the presentation of a notification about a communications session. For example, setting data can be defined at a device level or an account level (e.g., stored in a device profile or in a user account) and override data can be defined at the account level. Such settings can include a ringer setting at the device level and an away setting at the account level. The ringer setting may prohibit the presentation of audible notifications. In this case, override data can be defined to also allow the presentation of the audible notifications. In comparison, the away setting may temporarily stop routing communications to the user device (e.g., during daytime or when the user is at a location remote from a VCD, calls to the user's mobile device would not be routed to the VCD). In this case, override data can be defined to route the communications and present notifications.

FIG. 1 illustrates an example network for outbound communications from a user device, according to certain embodiments of the present disclosure. As illustrated, a VCD 110 is operated by a user 112. The VCD 110 is communicatively coupled with a computer system 120 of a service provider. The computer system 120 includes a communications system 121 and a language processing system 122 that manage various functionalities of the VCD 110, including the capability of establishing communications sessions. In turn, the computer system 120 is communicatively coupled with a PSTN system 130 of an operator. The VCD 110 is registered with the service provider under a user service account 123 (e.g., a first user account). The user 112 also has a user carrier account 132 with the operator (e.g., a second user account), where this user carrier account 132 enables phone calls to and from a mobile device of the user 112 (e.g., the user carrier account 132 is used to access the PSTN system 130). An outbound communications request corresponds to a request from the VCD 110 (or other user devices registered with the service provider) for communications to destinations over the PSTS 130. An outbound communications session corresponds to a communications session origination from the VCD 110 (or any of the other registered user devices).

The user service account 123 is linked to the user carrier account 132 to enable phone calls to and from the VCD 110, where these phone calls rely on the user carrier account 132. For example, the computer system 120 stores a user service identifier 124, a user carrier identifier 125, and a user device identifier 126, among other information (e.g., authentication tokens, access tokens, and contacts list) in association with the user service account 123. In this way, upon an utterance of the user 112 to call a contact (e.g., "Alexa, call John"), the VCD 110 detects a wakeword (e.g., "Alexa") and sends audio data that represents the utterance to the computer system 120. In response, the language process system 122 may apply automatic speech recognition (ASR) processing to the audio data to generate text data. The text data can be provided for natural language understanding (NLU) processing that analyzes the text data in order to determine the intent of the spoken utterance, which can be provided as intent data. Using text data representing the received audio data, NLU processing may compare the structure of the utterance to various sample utterances in an attempt to match the spoken utterance to one of the sample utterances. For example, NLU processing may determine that the user utterance has a format of "{Wakeword}, {Start Communications Session} {Contact Name}," and may identify the elements of utterance based on the determined format. For instance, the NLU processing may determine that the intent of this utterance is for a phone call to be started with one of the user's 112 contacts having the name "John." The communications system 121 may then determine that communications session is requested from the VCD 110 having the device identifier 126 and may perform a connection resolution by accessing the user service account 123 based on the device identifier 126, determine the user carrier identifier 125, and a destination of the communications session from the contacts list, and may send a phone call request to the PSTN system 130, where this request identifies the source as the user carrier identifier 125 and the destination.

The computer system 120 also stores a device profile 127 for the VCD 110. This device profile 127 can be stored in association with the user account 123. A DND setting 128 can be maintained in association with the device profile 127 (e.g., can be stored in the device profile 127). In particular setting data can be updated over time to indicate whether the VCD 110 is to be in a DND mode.

In an example, the VCD 110 receives an utterance of the user 112 indicating an intent for an outbound emergency call (e.g., "Alexa, call 911"). The VCD 110 generates and sends audio data 114 representing this utterance to the computer system 120. In turn, the language processing system 122 determines intent data for a phone call to an emergency service device 140. The communications system 121 performs a connection resolution and sends a request for an outbound call 160 to the PSTN system 130, where this request identifies the user carrier identifier 125 as the source and a phone number of the emergency service device 140 as the destination. In addition, the computer system 120 generates and sends routing data to the VCD 110 to facilitate a communications session between the VCD and the emergency service device 140 via the PSTN system 130.

Because the intent data indicates an emergency call, the communications system 121 can also generate override data 150, define a time period during which the override data 150 is valid and is to be enforced to override the DND setting 128, and associate the override data 150 with the user service account 123. For example, the override data 150 is stored in a database in association with the user identifier 152 and additional data associated with the outbound communications session and representing a predefined time duration during which the override data is valid. For instance, the override data 150, as stored, includes a user identifier 152 equal to the user service identifier 12, a timestamp 154 of the start or the end of the outbound call 160, and a predefined duration 156 (e.g., five minutes or some other amount of time). In another example, the override data 150 can be stored in the user service account 123 and/or the device profile 127.

Once the override data 150 is generated, the communications system 121 may also notify the user 112 that the DND setting 118 will be overridden for the predefined time duration. For example, an email message can be sent to an email address of the user 112 and/or a notification can be sent to the user's 112 mobile device. Further, the language processing system 122 can generate text-to-speech (TTS) audio data indicating the override and the communication systems 121 may instruct the VCD 110 to present the TTS audio.

The VCD 110 is an example of a user device. The embodiments of the present disclosure similarly apply to other types of user devices such a smartphone, a tablet, a laptop, a personal computer, a voice-controlled multimedia device (VCMD), a smartwatch, a smart appliance, or any other computing device that includes suitable hardware and software. Further, the user device not be responsive to a wakeword and even if responsive, requesting a communication session need not involve a user utterance. Instead, data indicative of the request may be sent to the computer system 120, where the type of data depends on the input modality of the user device. For example, the user 112 may select a contact or input a phone number and request a call from a menu of the user device, such as a smartphone. The request can be received by the computer system 120 as text data that identifies the contact. In such situations, the language processing system 222 may not be used because processing audio data is not needed. Instead, the text data received from the user device can be input to the communications system 121.

Although FIG. 1 illustrates an association between the user service account 123 and the user carrier account 132, the embodiments of the present disclosure are not limited as such. For example, no such association may be needed for outbound (and inbound) communications. In particular, the communications system 121 may implement the communications functionalities solely based on the user service account 123 and without the user service account 123 being linked to a user carrier account.

Figure 2:
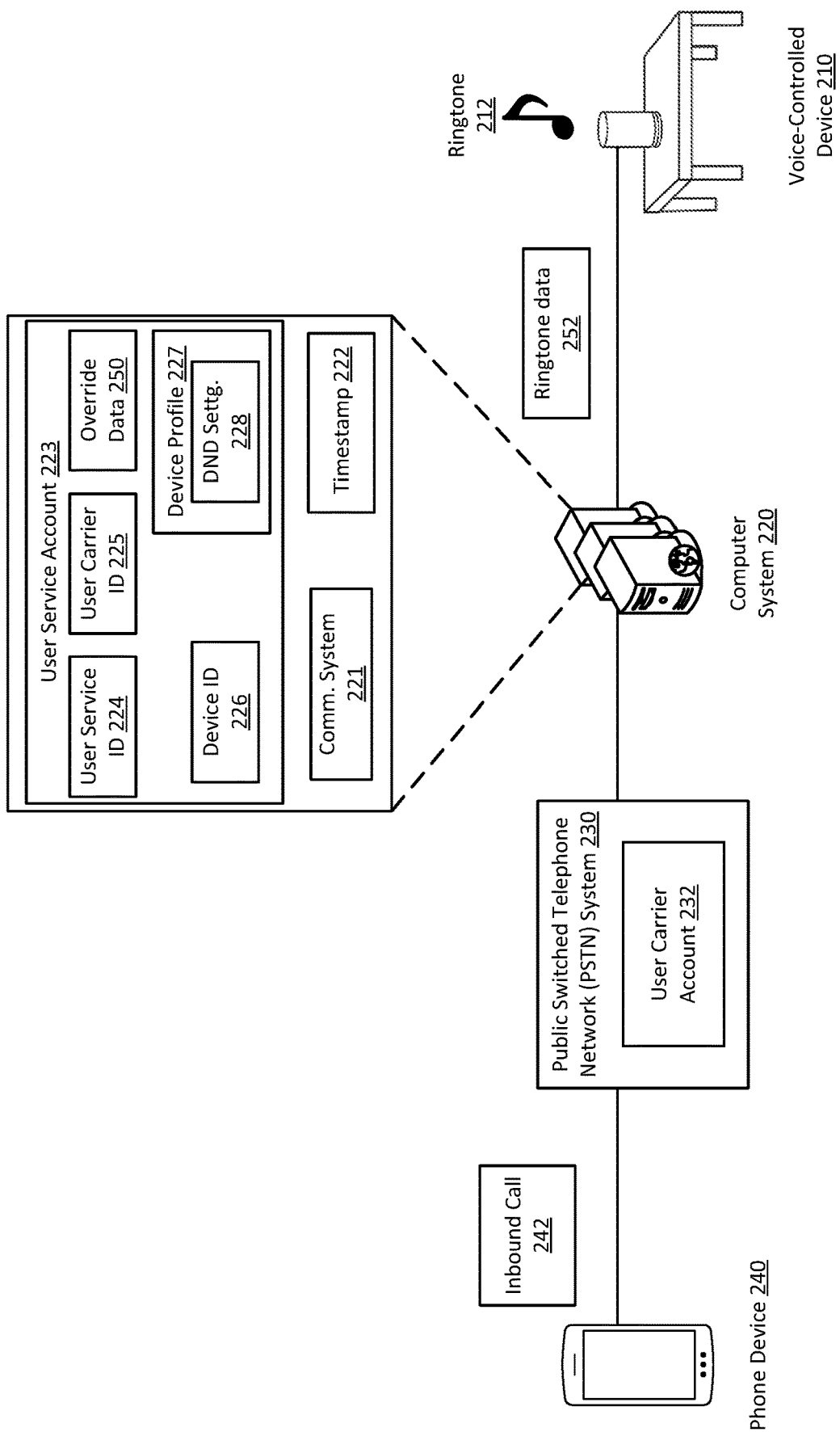
FIG. 2 illustrates an example network for inbound communications to a user device, according to certain embodiments of the present disclosure.

FIG. 2 illustrates an example network for inbound communications to a user device, according to certain embodiments of the present disclosure. As illustrated, a VCD 210 of a user is communicatively coupled with a computer system 220 of a service provider. The computer system 220 includes a communications system 221 and is communicatively coupled with a PSTN system 230 of an operator. The VCD 210 is registered with the service provider under a user service account 223. The user also has a user carrier account 232 with the operator where this user carrier account 232 enables phone calls to and from a mobile device of the user. The VCD 210, the computer system 220, and the PSTN system 230 are examples of the VCD 110, the computer system 120, and the PSTN system 130 of FIG. 1. An inbound communications request corresponds to a request received via the PSTN system 230 from a source and requesting communication with the VCD 120 (or other user devices registered with the service provider). An inbound communications session corresponds to a communications session origination from such a source.

In an example, the user service account 223 is linked to the user carrier account 232 to enable phone calls to and from the VCD 210, whereby a service identifier 224, a user carrier identifier 225, and a user device identifier 226, among other information are stored under the user service account 223. The user service account 223 also stored a device profile 227 that includes a DND setting 228 set to active (e.g., the do not disturb mode is "on"). Based on a previous outbound communications from the VCD 210 to an emergency service device, override data 250 is also associated with the user service account 223.

A caller operated phone device 240 is used to call the user's mobile device. The phone device 240 sends a request for an inbound call 242 to the PSTN system 230. A connection resolution is performed, and the user carrier ID 225 is determined as a destination of the inbound call 242, in addition to the user's mobile device. Accordingly, the PSTN system 230 sends a request for inbound communications to the computer system 220. In response, the communication systems 221 generates a timestamp 222 of the request and performs a connection resolution by identifying the user service account 223 based on the user carrier identifier 225, determining the device identifier 126, and sending a request to the VCD 210 for a communications session having the source as the phone device 240 and the destination as the VCD 210.

In addition, the communications system 221 can determine whether the VCD 210 is to be rung or not. In an example, the communications system 221 accesses the device profile 227. If the DND setting 228 indicates that the VCD 210 is not to be rung, the communications system 221 accesses the override data 250 corresponding to the user service ID 224 to determine whether the DND setting is to be overridden. For instance, the communications system 221 compares the difference between the timestamp included in the override data 250 and the timestamp 222 to the predefined time duration included in the override data 250. If the difference is less than the predefined time duration, the decision is to override the DND setting 228. If so, the communications system 221 sends ringtone data 252 to the VCD 210 to present a ringtone 212. The ringtone data 252 can instruct the VCD 210 to play the ringtone 212. In addition, the ringtone 252 can set a volume, a pattern, and/or a time length for the presentation. Activating other types of notifications is also possible, such as presenting a visual notification. In this case, the communications system 221 may instruct the VCD 210 to emit a particular light in a particular pattern.

Although FIG. 2 illustrates an association between the user service account 223 and the user carrier account 232, the embodiments of the present disclosure are not limited as such. For example, no such association may be needed for inbound (and outbound) communications. In particular, the communications system 221 may implement the communications functionalities solely based on the user service account 223 and without the user service account 223 being linked to a user carrier account.

Figure 3:
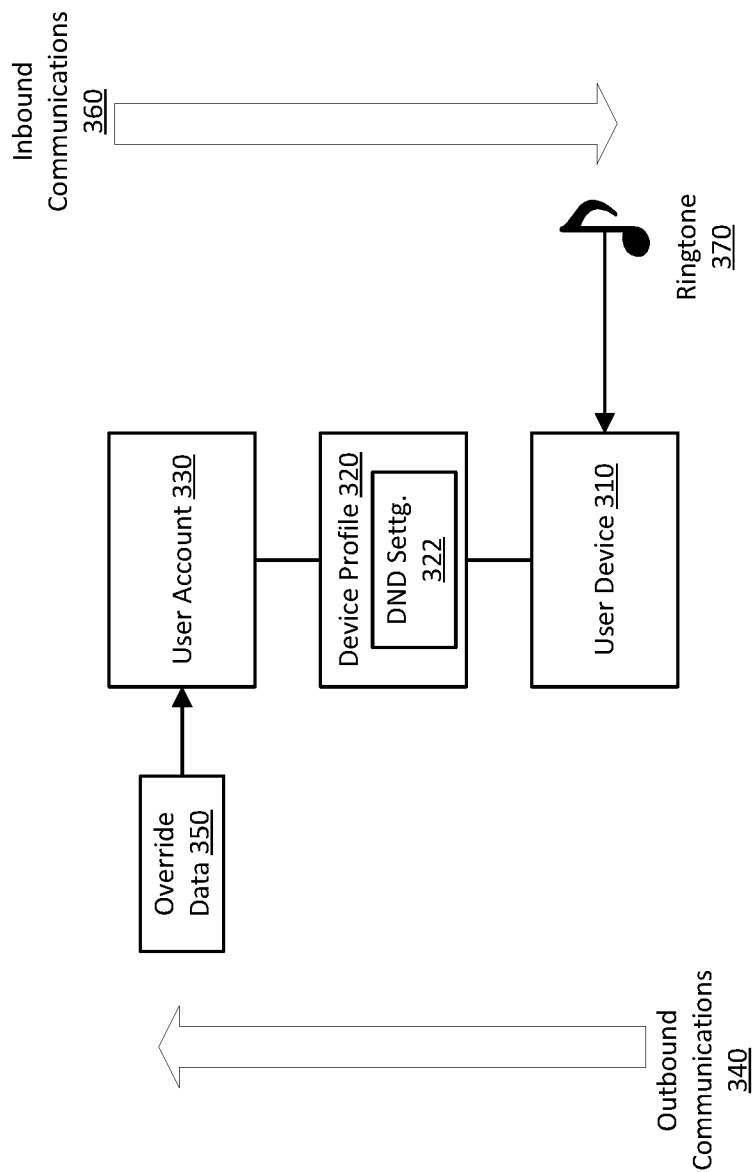
FIG. 3 illustrates example notification setting data and override data, according to certain embodiments of the present disclosure.

FIG. 3 illustrates example notification setting data and override data, according to certain embodiments of the present disclosure. Generally, the notification setting data can prohibit an output of a notification, such as a presentation of the notification, about inbound communications and can be defined at a device level. In comparison, the override data can enable the output and can be defined at a user account level.

As illustrated, a user device 310 has a device profile 320 that is associated with a user account 330. A DND setting 322 is maintained in the device profile 320. After the DND setting 322 is set to active, an outbound communications 340 is initiated from the user device 310 to a destination designated as an emergency destination. Accordingly, override data 350 is generated and associated with the user account 330. Thereafter, inbound communications 360 destined to the user device 310 is received within a time frame during which the override data 350 is valid. Accordingly, the user device 310 is instructed to play a ringtone 370, thereby overriding the DND setting 322.

Figure 4:
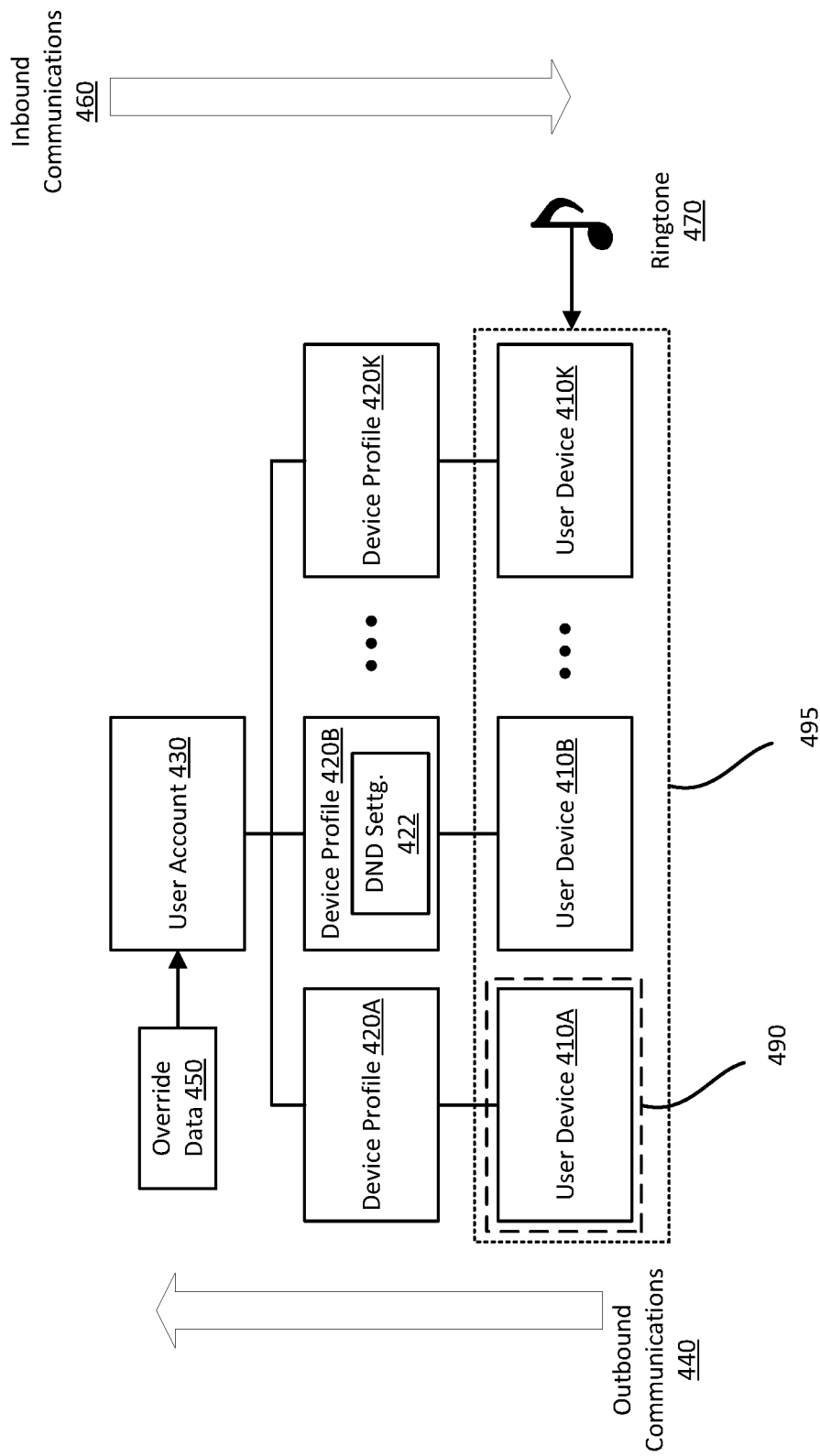
FIG. 4 illustrates example notification setting data and override data for multiple user devices registered under a user account, according to certain embodiments of the present disclosure.

FIG. 4 illustrates example notification setting data and override data for multiple user devices registered under a user account, according to certain embodiments of the present disclosure. Because the override data can be defined at a user account level, a DND setting of a user device can be overridden even when outbound communications originated from a different user device.

As illustrated, multiple user devices 410A, 410B, . . . , 410K are available, each of which has a device profile (e.g., a device profile 420A corresponding to the user device 410A, a device profile 420B corresponding to the user device 410B, . . . , a device profile 420K corresponding to the user device 410K). The user devices 410A, 410B, . . . , 410K are also registered under the same user account 430. Some or all of the user devices 410A, 410B, . . . , 410K have a corresponding DND setting set to active. For instance, FIG. 4 illustrates that the user device 420B has an active DND setting 422 under its device profile 420B.

After the DND setting 422 is set to active, an outbound communications 440 is initiated from the user device 410A (which may not have an active DND setting) to a destination designated as an emergency destination, as illustrated with the dashed box, having the label 490, around the user device 410A. Accordingly, override data 450 is generated and associated with the user account 430. Thereafter, inbound communications 460 are received within a time frame during which the override data 450 is valid. The inbound communications 460 are associated with the user account 430 (e.g., are associated with a user service identifier stored under the user account 430). Accordingly, all of the user devices 410A, 410B, . . . , 410K are instructed to play a ringtone 470, as illustrated with the dotted box, having the label 495.

Figure 5:
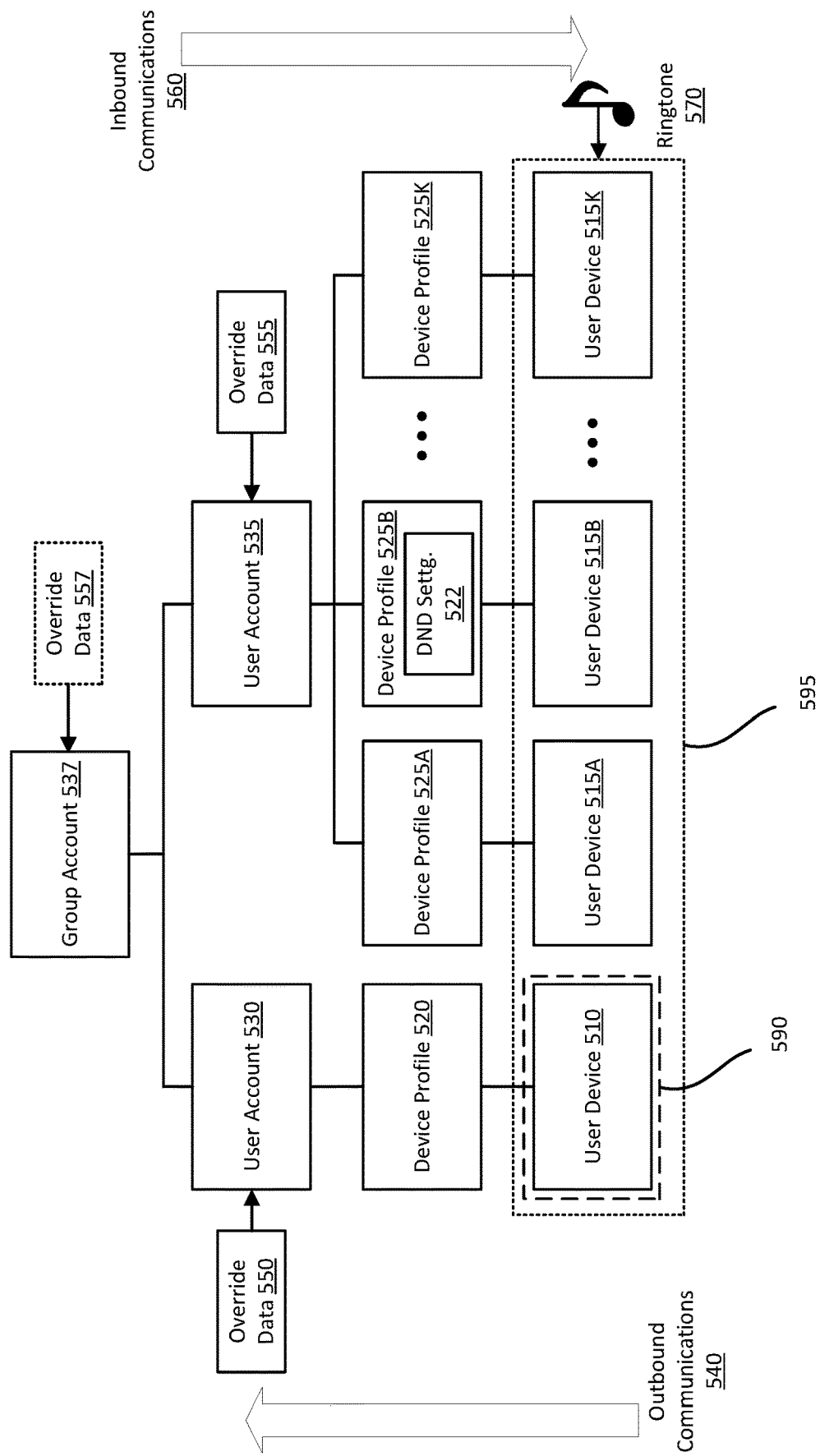
FIG. 5 illustrates example notification setting data and override data for multiple user devices registered under a group account, according to certain embodiments of the present disclosure.

FIG. 5 illustrates example notification setting data and override data for multiple user devices registered under a group account, according to certain embodiments of the present disclosure. In an example, multiple user devices may be registered with a user account corresponding to an individual. Multiple individuals may register their user accounts under a same group account. To illustrate, a family may have a group account corresponding to the family, and this group account can include two user accounts. The first one corresponds to the parents and the second one correspond to the children. In turn, one or more user devices may be registered under the parents' user account and one or more user devices may be registered under the childrens' user account. A DND setting of a user device can be overridden even when outbound communications originated from a different user device under a different user account.

As illustrated, multiple user devices 510, 515A, 515B, . . . , 515K are available, each of which has a device profile (e.g., a device profile 520 corresponding to the user device 510, a device profile 525A corresponding to the user device 515A, a device profile 525B corresponding to the user device 515B, . . . , a device profile 525K corresponding to the user device 515K). The user device 510 is registered under a first user account 530 and the user devices 515A, 515B, . . . , 515K are registered under a second user account 535. The first user account 530 and the second user account 535 are registered under the same group account 537. Some or all of the user devices 510, 515A, 515B, . . . , 515K have a corresponding DND setting set to active. For instance, FIG. 5 illustrates that the user device 525B has an active DND setting 522 under its device profile 525B.

After the DND setting 522 is set to active, an outbound communications 540 is initiated from the user device 510 (which may not have an active DND setting) to a destination designated as an emergency destination, as illustrated with the dashed box, having a label 590, around the user device 510. Accordingly, override data 550 is generated and associated with the first user account 530. Because the first user account 530 and the second user account 535 belong to the same group account 537, override data 555 is also generated and associated with the second user account 555, thereby propagating the DND override to the user devices 525A, 525B, . . . , 525K under the second user account 535. Alternatively, rather than generating two sets of override data and associating each with a user account, one set of override data 557 can be generated and associated with the group account 537.

Thereafter, inbound communications 560 are received within a valid override time frame. Different approaches may be followed for the DND override. In one approach, all of the user devices 510, 515A, 515B, ..., 515K under the group account 537 are instructed to play a ringtone 570, as illustrated with the dotted box having a label 595. In another approach, the inbound communications 560 are associated with the first user account 530 (e.g., are associated with a user service identifier stored under the first user account 530). Accordingly, only the user device 510 is instructed to play the ringtone 570. In yet another approach, the inbound communications 560 are associated with the second user account 535 (e.g., are associated with a user service identifier stored under the second user account 535). Accordingly, only the user devices 515A, 515B, ..., 515K are instructed to play a ringtone 570.

Figure 6:
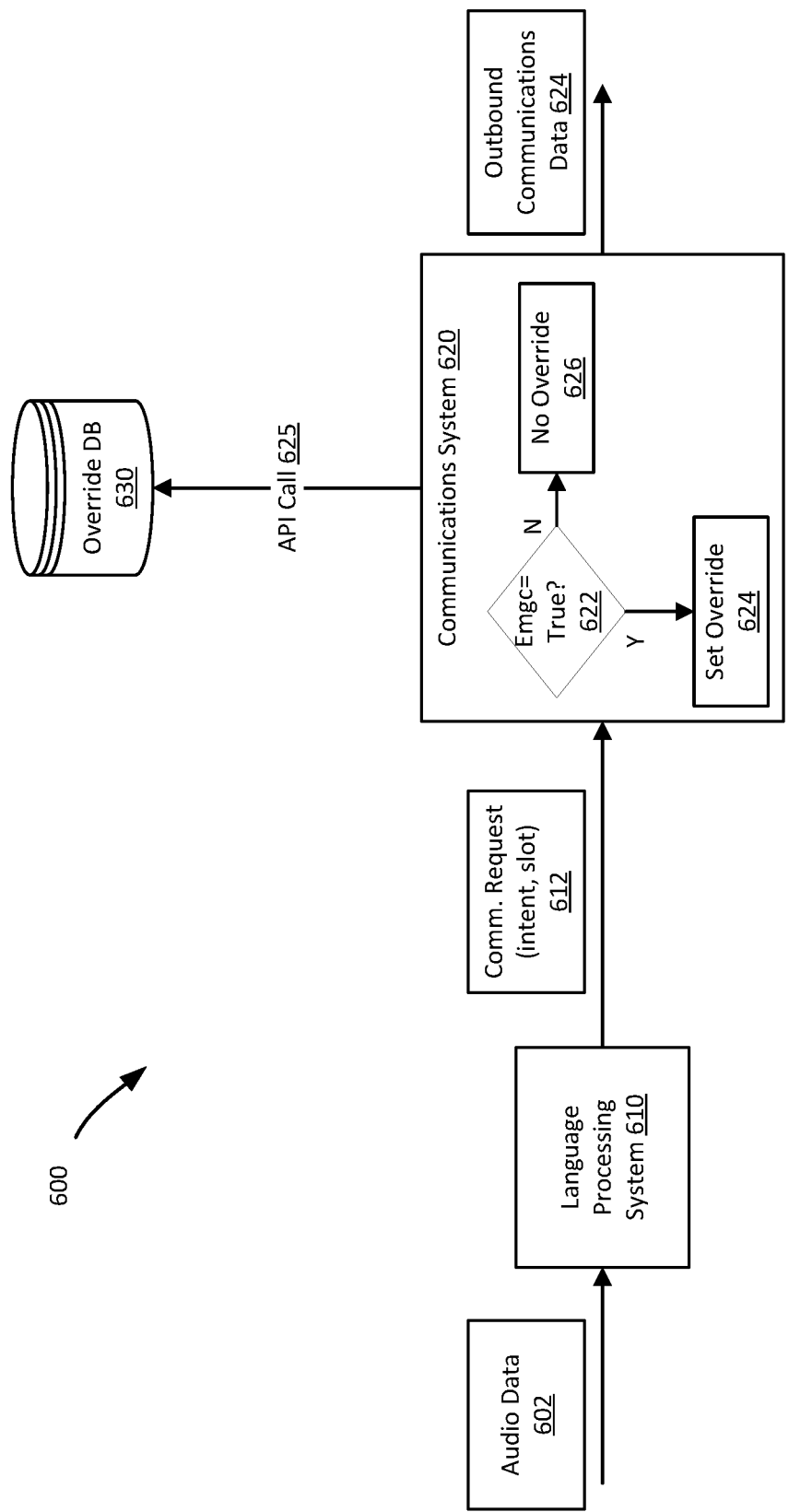
FIG. 6 illustrates an example computer system for outbound communications from a user device, according to certain embodiments of the present disclosure.

FIG. 6 illustrates an example computer system 600 for outbound communications from a user device, according to certain embodiments of the present disclosure. The computer system 600 is an example of the computer system 120 of FIG. 1 and includes a language processing system 610, a communications system 620, and an override database 630. The language processing system 610 receives audio data 602 from a user device, where the audio data 602 represents a user utterance requesting communications (e.g., "Alexa, call 911"). The language processing system 610 performs spoken language processing on the audio data 602 and determines intent for an outbound communications and a slot. The language processing system 610 sends a communication request 612 to the communication system 620, where the communication request 612 identifies the intent and the slot (e.g., intent for an outbound call to an emergency service device). As explained herein above, receiving and processing the audio data 602 is generally applicable to situations where the user device is a VCD. However, other types of user devices are possible and audio data may not be sent. Instead, a user device can send text data indicating a request for outbound communications to an emergency number.

The communications system 620 performs a connection resolution to determine the source, the destination, and the route and returns this information to the user device as outbound communications data 624 with instructions to establish a communications session with the destination. Performing the connection resolution includes determining a device identifier of the user device, a user service identifier, a user carrier identifier, the type of the requested communications (e.g., emergency calling), possible communications channels (e.g., mobile carrier and landline channels), and user preferences for using these channels. The communications system 620 can also include a calling agent that facilitates the communications session between the user device and the destination based on the route.

In addition, the communications system 620 determines 622 whether the type of the requested communications is for emergency calling. If so, the communications system 620 sets 624 an override of a possible DND setting. Otherwise, the override is not set 626. Setting 624 the override can include performing an API call 624 to the override database 630. The API call 624 can retrieve the different user service identifiers that belong to a home group, as applicable and store override data in the override database 630 for each user service identifier, where the override data includes the user service identifier, a timestamp associated with the outbound communications, and a predefined time duration. The timestamp can correspond to a time of the start of the outbound communications session (e.g., wherein the outbound communications session was initiated) or to the time when the communications request 612 was received. Further, if the outbound communications lasts longer than the predefined time duration, the communications system 620 may perform another API call 624 to update the timestamp to a time corresponding to the end of the communications session (e.g., wherein the outbound communications session was terminated). When the first API call 624 is made, the communications system 620 may also generate and send a notification (e.g., an email message, a mobile phone notification, and/or or a TTS audio) about the override being performed.

Figure 7:
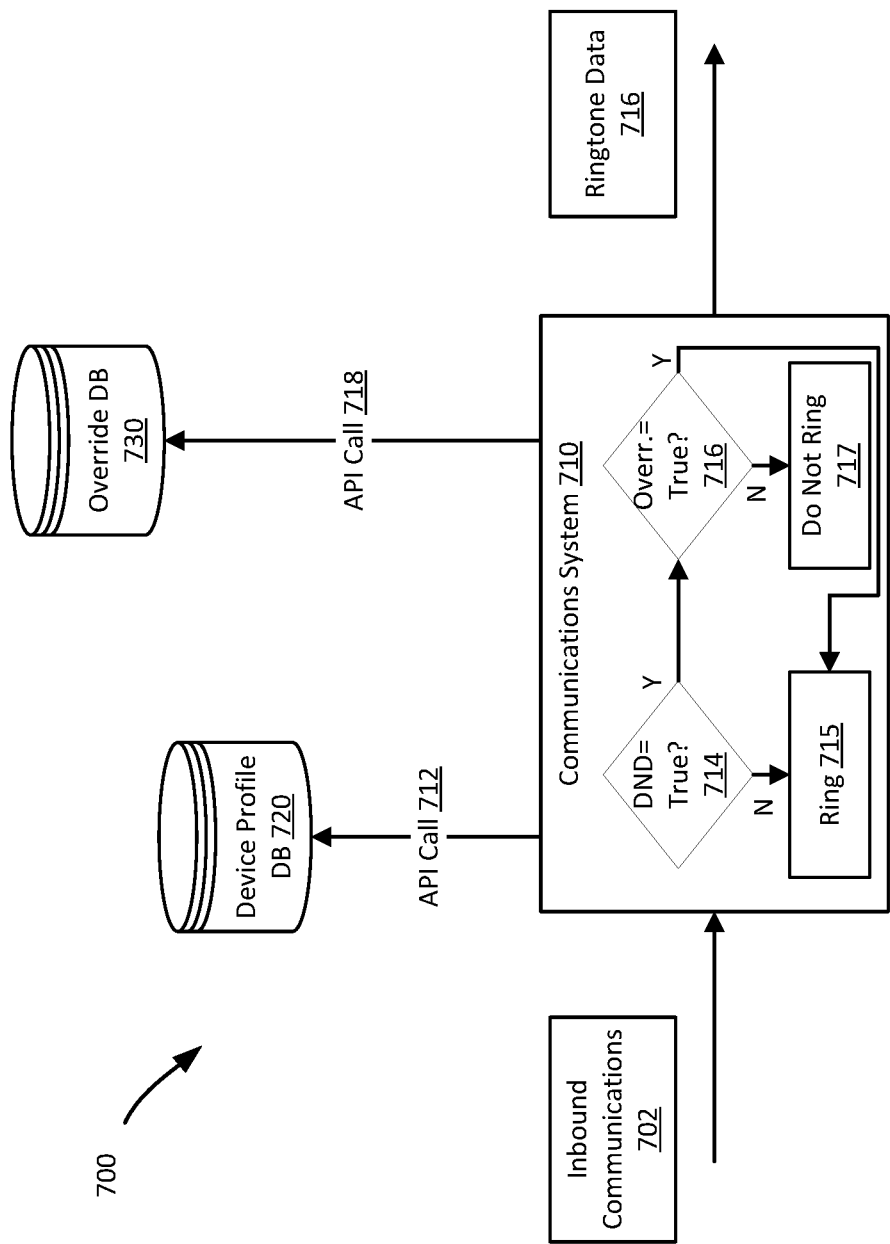
FIG. 7 illustrates an example computer system for inbound communications to a user device, according to certain embodiments of the present disclosure.

FIG. 7 illustrates an example computer system 700 for inbound communications to a user device, according to certain embodiments of the present disclosure. The computer system 700 is an example of the computer system 220 of FIG. 2 and includes a communications system 710, a device profile database 720, and an override database 730. The communications system receives a request 702 for the inbound communications. This request 702 may include a user carrier identifier. The communications system 710 performs a connection resolution to determine the source and the destination, where the destination can be one or more user devices registered under a user account and/or a group account. For each of such user devices, the communications system 710 determines a device identifier. Given a device identifier for a user device, the communications system 710 performs an API call 712 to the device profile database 720 to determine 714 whether a DND setting of the user device is set to active. If not set to active, the communications system 710 determines 715 that the user device is to be rung. Otherwise, the communications system 710 determines 716 whether the DND setting is to be overridden. If so, the communications system 710 determines 715 that the user device is to be rung. Otherwise, the communications system 710 determines 717 that the user device is not to be rung. In an example, determining 716 whether the DND setting is to be overridden includes performing an API call 718 to the override database 730. The API call 718 includes the user service identifier associated with the device identifier. The timestamp of the override data is compared to the current time and if the difference is less than the predefined time duration of the override data, the communications system 710 determines that the DND setting is to be overridden.

FIGS. 8-14 show illustrative flows for generating and using data to override a DND setting, in accordance with various embodiments. Some or all of instructions for performing the operations of the illustrative flow can be implemented as hardware circuitry and/or stored as computer-readable instructions on a non-transitory computer-readable medium of a computer system and/or a user device, such as the computer system 220 and the user device 210 of FIG. 2. As implemented, the instructions represent modules that include circuitry or code executable by a processor(s) of the computer system and/or the user device. The use of such instructions configures the computer system and/or the user device to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

Figure 8:
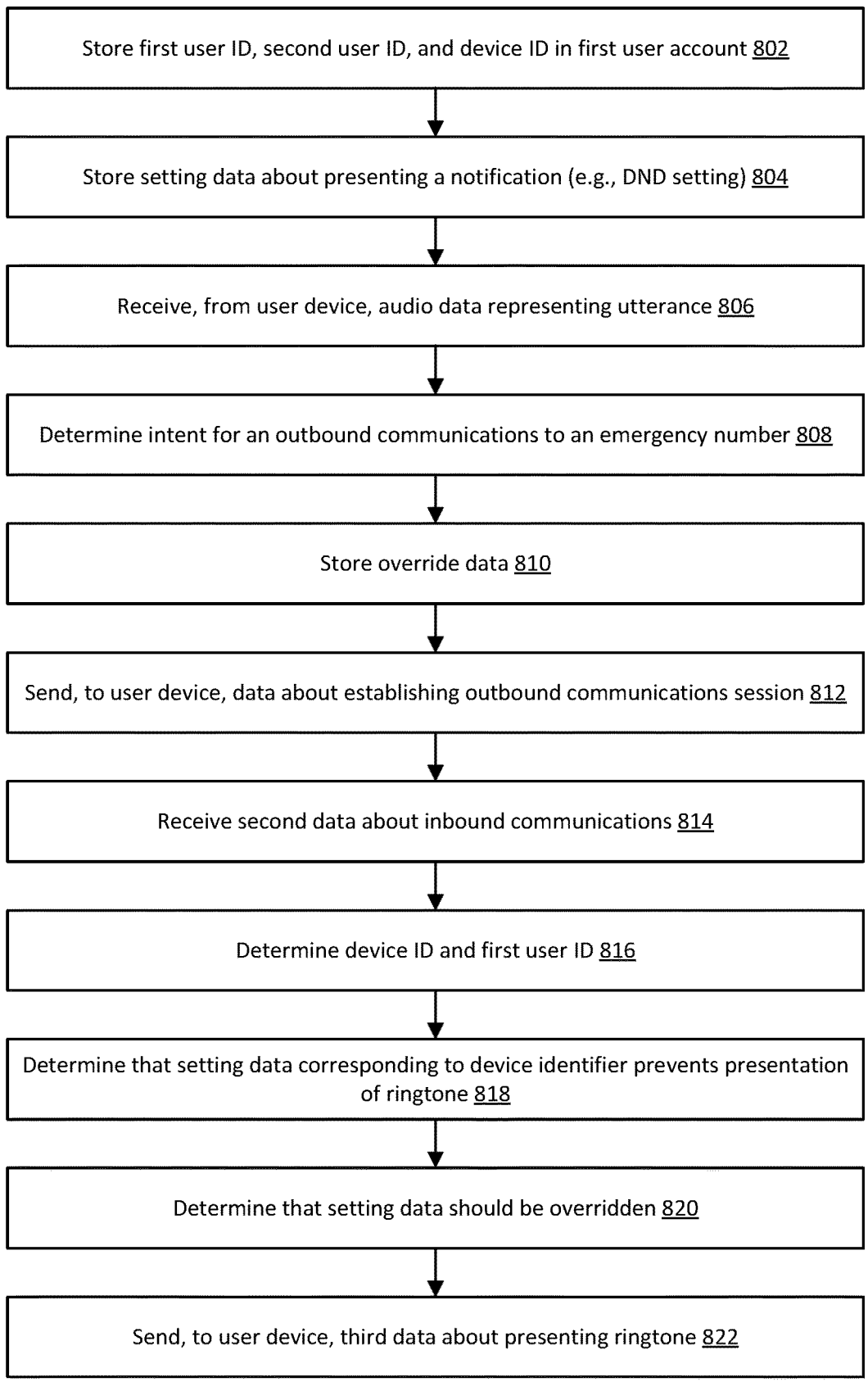
FIG. 8 illustrates an example flow for managing notifications to a user device, according to certain embodiments of the present disclosure.

FIG. 8 illustrates an example flow for managing notifications to a user device (such as a VCD or some other user device type), according to certain embodiments of the present disclosure. In an example, the flow may start at operation 802, where the computer system stores a first user identifier associated with a first user account (e.g., a user service identifier), a second user identifier associated with a second user account (e.g., a user carrier identifier), and a device identifier in the first user account. For instance, the first user account corresponds to a registration of a user with a service provider. The second user account corresponds to a user registration with an operator of a PSTN system (or some other type of a communications network system). The device identifier corresponds to a registration of the user device with the service provider under the first user account. Storing the first user identifier and the second user identifier in the first user account is an example of associating the first user account with the second user account.

At operation 804, the computer system stores setting data indicating that a notification about a communications session associated with the second user account is prohibited (e.g., data indicating that a notification about a communications session via a communications network system is prohibited, such as a DND setting set to active to prohibit the output of a ringtone). In an example, the setting data is stored in association with a device profile of the user device (such as in the device profile), thereby indicating that the notification is not to be presented by the user device.

At operation 806, the computer system receives from the user device audio data representing a user utterance. The user utterance may request outbound communications to an emergency service device.

At operation 808, the computer system determines, by performing spoken language processing on the audio data, an intent for the outbound communications to an emergency number via the PSTN system (or any other type of network destination).

At operation 810, the computer system stores, in a database, override data in response to the outbound communications being to the emergency number. In an example, the override data represents data indicating that the notification about the communications session is to be presented within a period of time of the communications session being requested. For instance, the override data includes the first user identifier, a first timestamp associated with the outbound communications, and a predefined time duration during which the override data is valid. Storing the override data in the database as including the first user identifier is an example of associating the first user account with the override data.

At operation 812, the computer system sends, to the user device, first data about establishing the outbound communications session via the PSTN system. The first data includes route information.

At operation 814, the computer system receives second data about inbound communications. The second data is sent via the PSTN system and includes the second user identifier. This second data is an example of a request associated with the second user account for an inbound communications session.

At operation 816, the computer system determines the device identifier and the first user identifier from the first user account based on the second user identifier. For instance, the computer system uses the second user identifier in a look up of user accounts to identify the first user account and retrieve the device identifier and the first user identifier. Retrieving the device identifier represents an example of determining that the user device is a destination of the inbound communications session based on the first user account being associated with the user device and with the second user account.

At operation 818, the computer system determines that the setting data corresponding to the device identifier prohibits the presentation of the notification (e.g., the ringtone). For example, the computer system uses the device identifier for an API call to retrieve the setting data from the device profile.

At operation 820, the computer system determines that the setting data is to be overridden. For example, the computer system determines the override data associated with the first user account by using the first user identifier for an API call to retrieve the override data. The override data indicates that the notification is to be presented based at least in part on the inbound communications session being requested within the time frame. For instance, the computer system determines a difference between a second timestamp associated with the inbound communications and the first timestamp and determines that this difference is less than the predefined time duration.

At operation 822, the computer system sends, to the user device, third data related to presenting the ringtone. The third data can instruct the user device to present the ringtone and can set a volume, a pattern, and/or a time length for the presentation.

Figure 9:
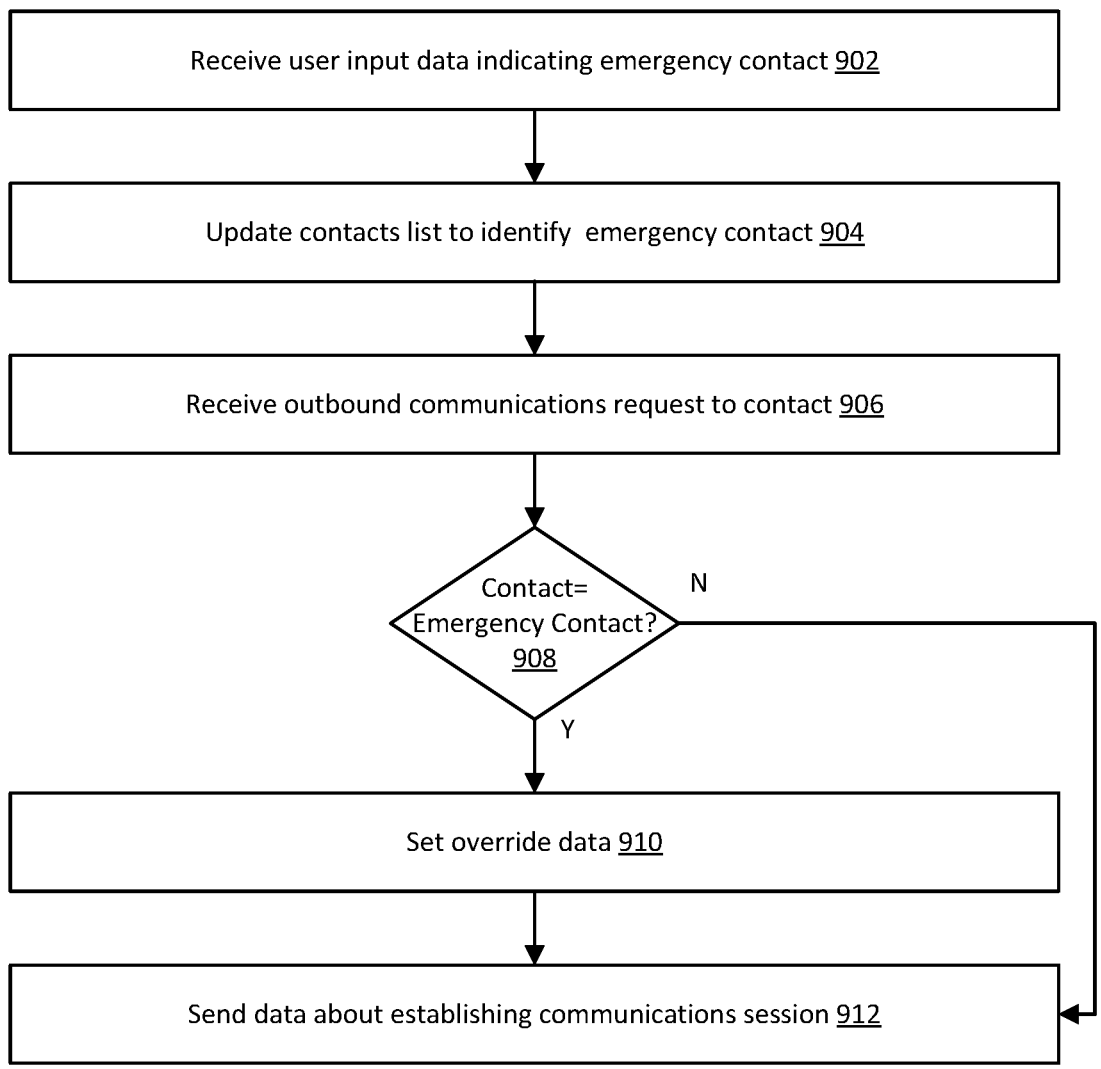
FIG. 9 illustrates an example flow for generating override data based on a contacts list defined in part by a user, according to certain embodiments of the present disclosure.

FIG. 9 illustrates an example flow for generating override data based on a contacts list defined in part by a user, according to certain embodiments of the present disclosure. In an example, the flow may start at operation 902, where the computer system may receive user input data indicating an emergency contact. For example, a user may access, via a user interface, their user account with the service provider and designate one or more of their contacts from the contacts list as emergency contacts or to add such emergency contacts to the contacts list.

At operation 904, the computer system updates the contacts list to identify a contact as an emergency contact based on the user input data. For instance, the computer system updates an attribute of the contact under the contacts list indicating that this contact has an emergency attribute.

At operation 906, the computer system receives, from a user device, an outbound communications request to a contact from the contacts list. For example, the outbound communications request corresponds to a user utterance for a call to the contact.

At operation 908, the computer system determines whether the contact is an emergency contact. For example, the computer system determines whether the attribute of the contact from the contacts list corresponds to an emergency attribute. If so, operation 910 may be performed in parallel to, before, or after operation 912. Otherwise, operation 912 is performed without performing operation 910.

At operation 910, the computer system sets override data. Because the contact is an emergency contact, the override data is generated to temporarily override a DND setting.

At operation 912, the computer system sends, to the user device, data about establishing an outbound communications session.

Figure 10:
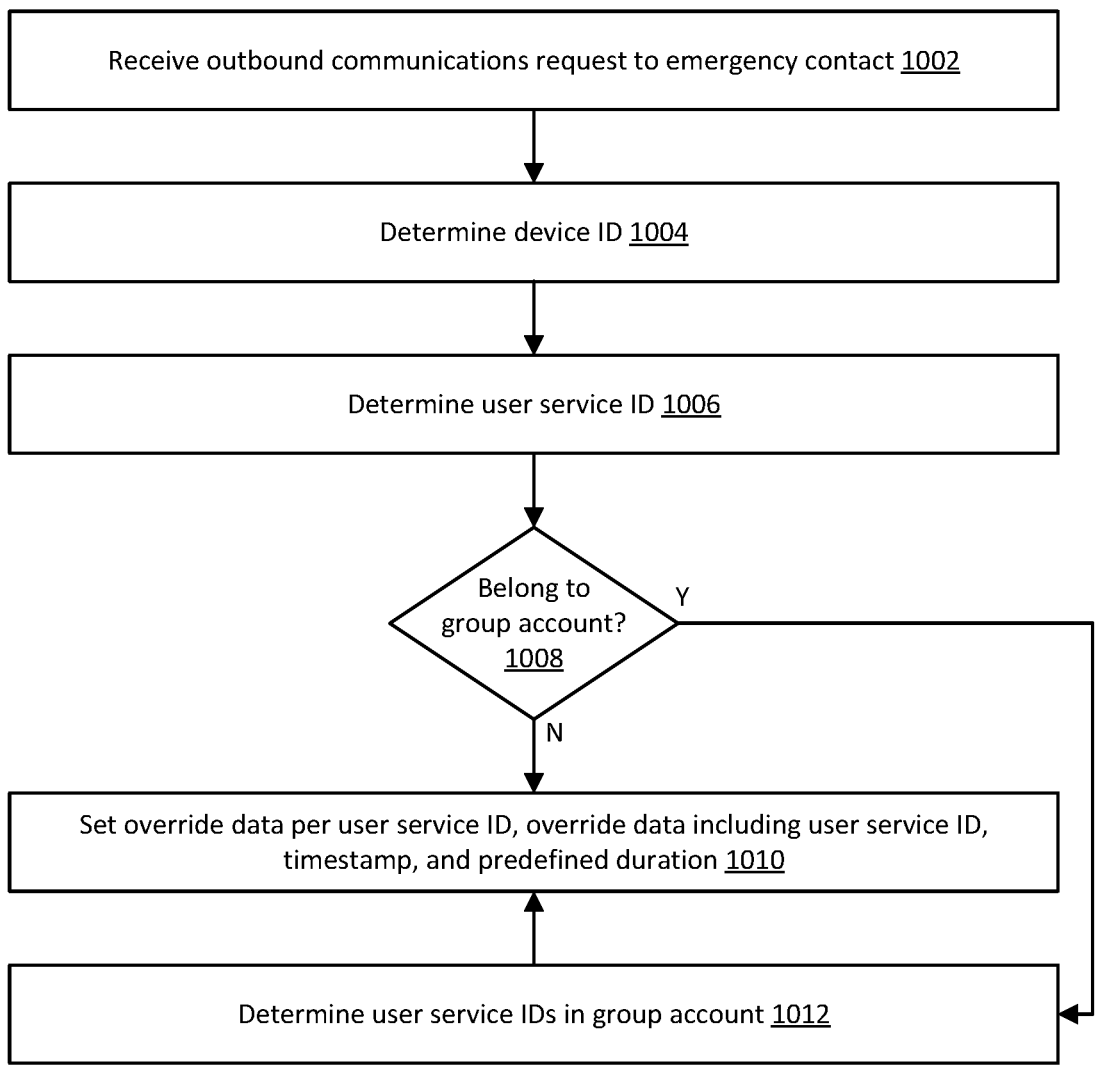
FIG. 10 illustrates an example flow for generating override data based on the number of user devices, according to certain embodiments of the present disclosure.

FIG. 10 illustrates an example flow for generating override data based on the number of user devices, according to certain embodiments of the present disclosure. The example flow may start at operation 1002, where the computer system receives, from a user device, an outbound communications request to an emergency contact.

At operation 1004, the computer system determines a device identifier of the user device. For example, the device identifier can be determined from the outbound communications request.

At operation 1006, the computer system determines a user service identifier. For example, the computer system uses the device identifier to look up user accounts, identify a user account that stores the device identifier, and retrieve the user service identifier stored in the user account.

At operation 1008, the computer system determines whether the user account belongs to a group account. For example, the computer system checks whether the user account is registered under a group account. If not, operation 1010 may be performed. Otherwise, operation 1012 may be performed followed by operation 1010.

At operation 1010, the computer system sets over data per user service identifier. For example, the computer system performs an API call to an override database, where the API call includes the user service identifier, a timestamp associated with the outbound communications request, and a predefined duration. These parameters can be stored as the override data in the override database.

At operation 1012, the computer system determines the user service identifiers in the group account. For example, each of the user accounts belonging to the group account stores a user service identifier. The computer system retrieves such identifiers from the user accounts to then store override data in association with each of them.

Figure 11:
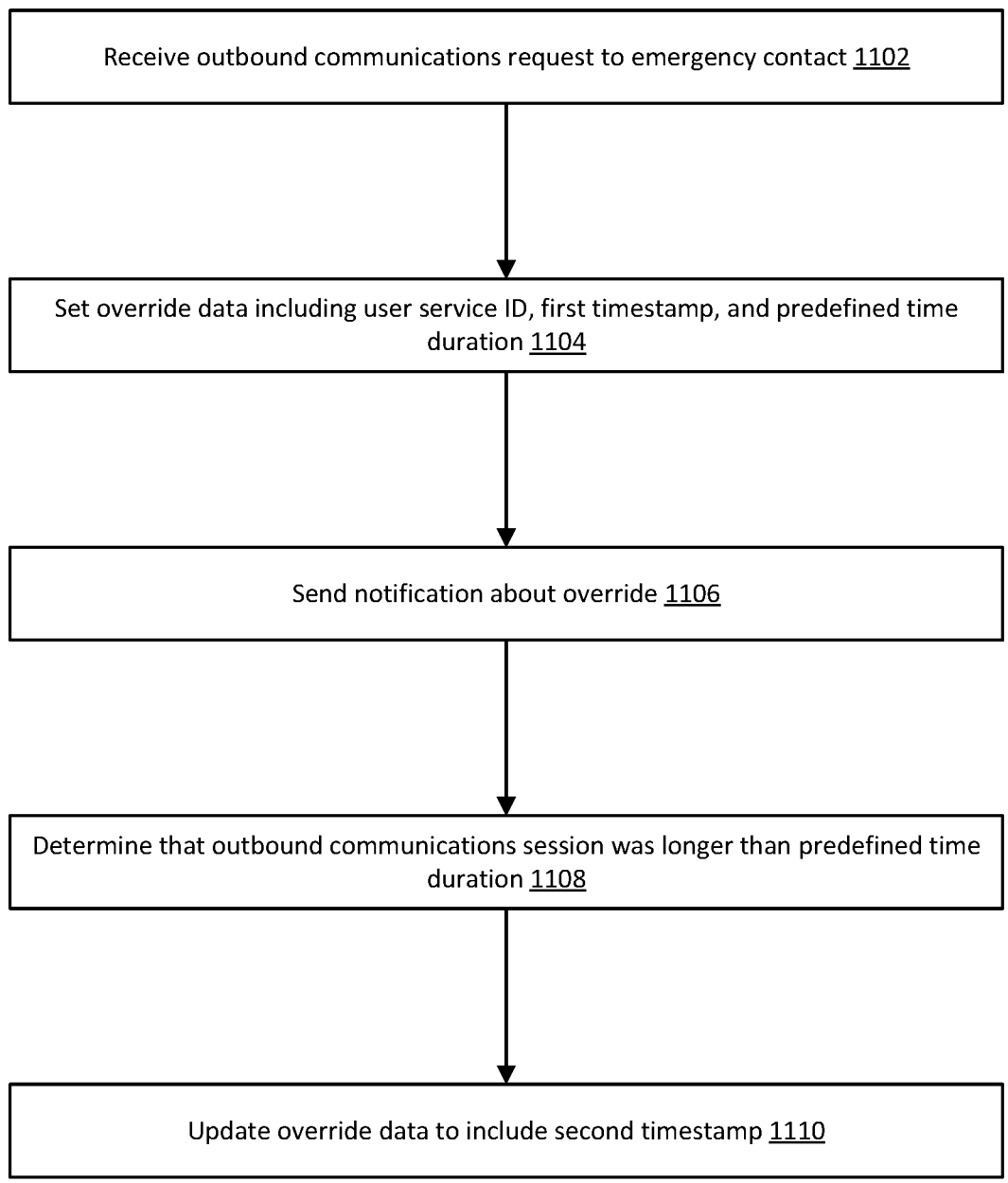
FIG. 11 illustrates an example flow for generating parameters of override data, according to certain embodiments of the present disclosure.

FIG. 11 illustrates an example flow for generating parameters of override data, according to certain embodiments of the present disclosure. The example flow may start at operation 1102, where the computer system receives, from a user device, an outbound communications request to an emergency contact.

At operation 1104, the computer system sets override data. For example, the computer system determines the device identifier of the user device and the user service identifier associated with the device identifier. The override data is generated and stored to include the user service identifier, a first timestamp associated with the outbound communications request (e.g., a time of this request or a start time of the outbound communications session), and a predefined time duration.

At operation 1106, the computer system generates and sends a notification about a possible override of a DND setting. For example, the computer system sends an email message to an email address, a notification to a mobile device, and/or TTS audio for presentation at the user device.

At operation 1108, the computer system determines that the resulting outbound communications session was longer than the predefined time duration. For example, the computer system determines a second timestamp corresponding to the end of the outbound communications session and compares the difference between the first and second timestamps to the predefined time duration.

At operation 1110, the computer system updates the override data to include the second timestamp. For example, the computer system performs an API call to replace the first time stamp with the second time stamp in the stored override data (e.g., in the database).

Figure 12:
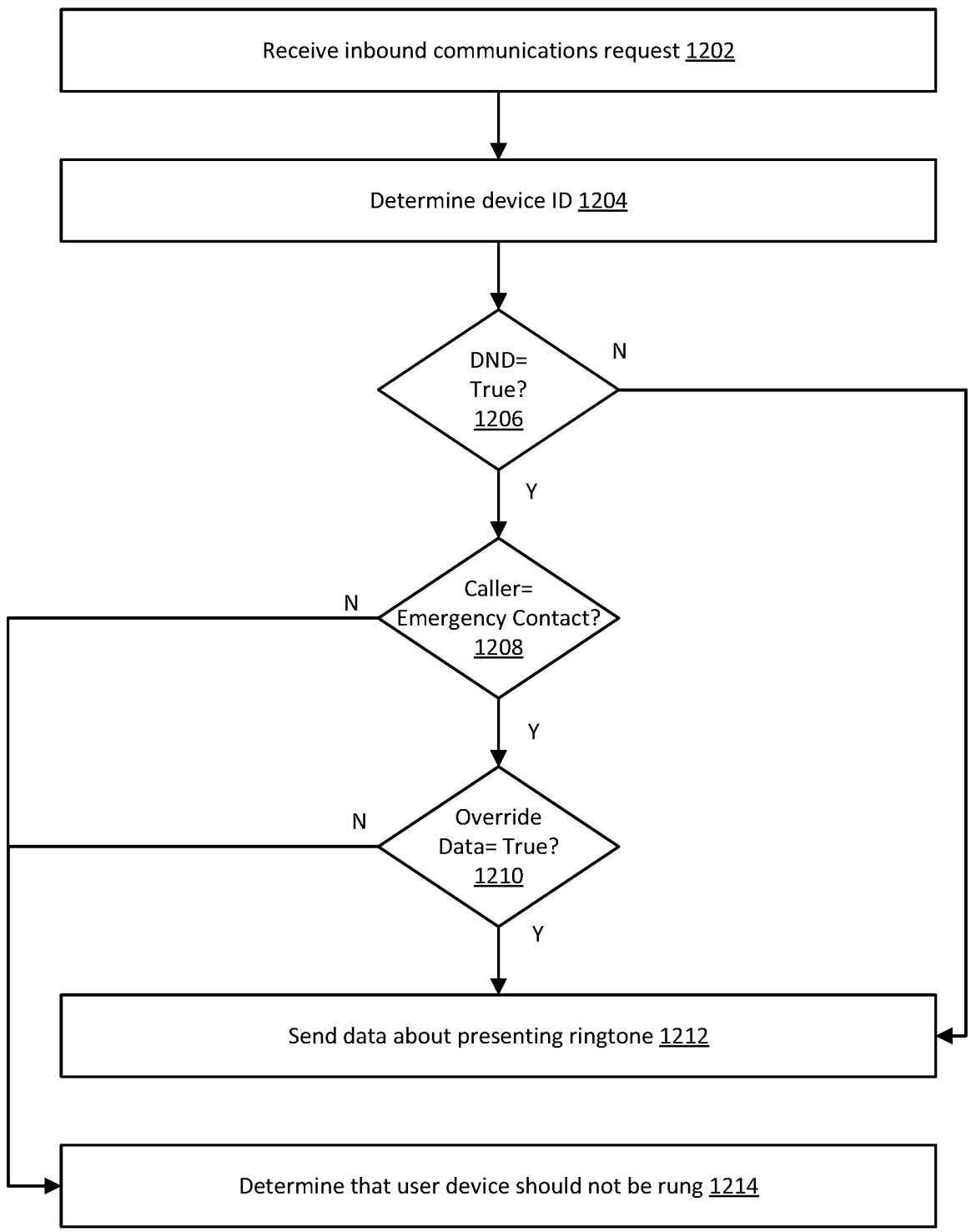
FIG. 12 illustrates an example flow for instructing a user device to present a notification, according to certain embodiments of the present disclosure.

FIG. 12 illustrates an example flow for instructing a user device to present a notification, according to certain embodiments of the present disclosure. The example flow may start at operation 1202, where the computer system receives an inbound communication request. The computer system determines a user service identifier associated with this request. For instance, the request includes a user carrier identifier. The computer system uses the user carrier identifier to look up user accounts, identify a user account that stores the user carrier identifier, and retrieve the user service identifier from this user account.

At operation 1204, the computer system determines a device identifier of the user device. For example, the computer system retrieves the device identifier from the user account.

At operation 1206, the computer system determines whether a DND setting of the user device is set to active. For example, the computer system uses the device identifier to look up a device profile of the user device and determines the setting data from the device profile. If the DND setting is not set to active (e.g., DND setting set to "off"), operation 1212 may follow operation 1206. Otherwise, operation 1208 may be performed.

At operation 1208, the computer system determines whether the caller corresponds to an emergency contact. This operation may be optionally performed to filter out inbound communications not originating from an emergency number or may be skipped to allow all inbound communications. In an example, the computer system accesses a contacts list from the user account and determines whether a match exists between the caller and contacts designated as emergency contacts in this list. If a match exists, operation 1210 may follow operation 1208. Otherwise, operation 1214 may be performed.

At operation 1210, the computer system determines whether the DND setting is to be overridden. For example, the computer system uses the user service identifier to retrieve the override data and determines whether the inbound communications request was received during a time frame during which the override data is valid. If so, operation 1212 may follow operation 1210. Otherwise, operation 1214 may be performed.

At operation 1212, the computer system sends, to the user device, data about presenting a ringtone. This data can instruct the user device to present the ringtone and can set a volume, a pattern, and/or a time length for the presentation.

At operation 1214, the computer system determines that the user device is not to be rung. Accordingly, the computer system may not generate or send the data about presenting the ringtone.

Figure 13:
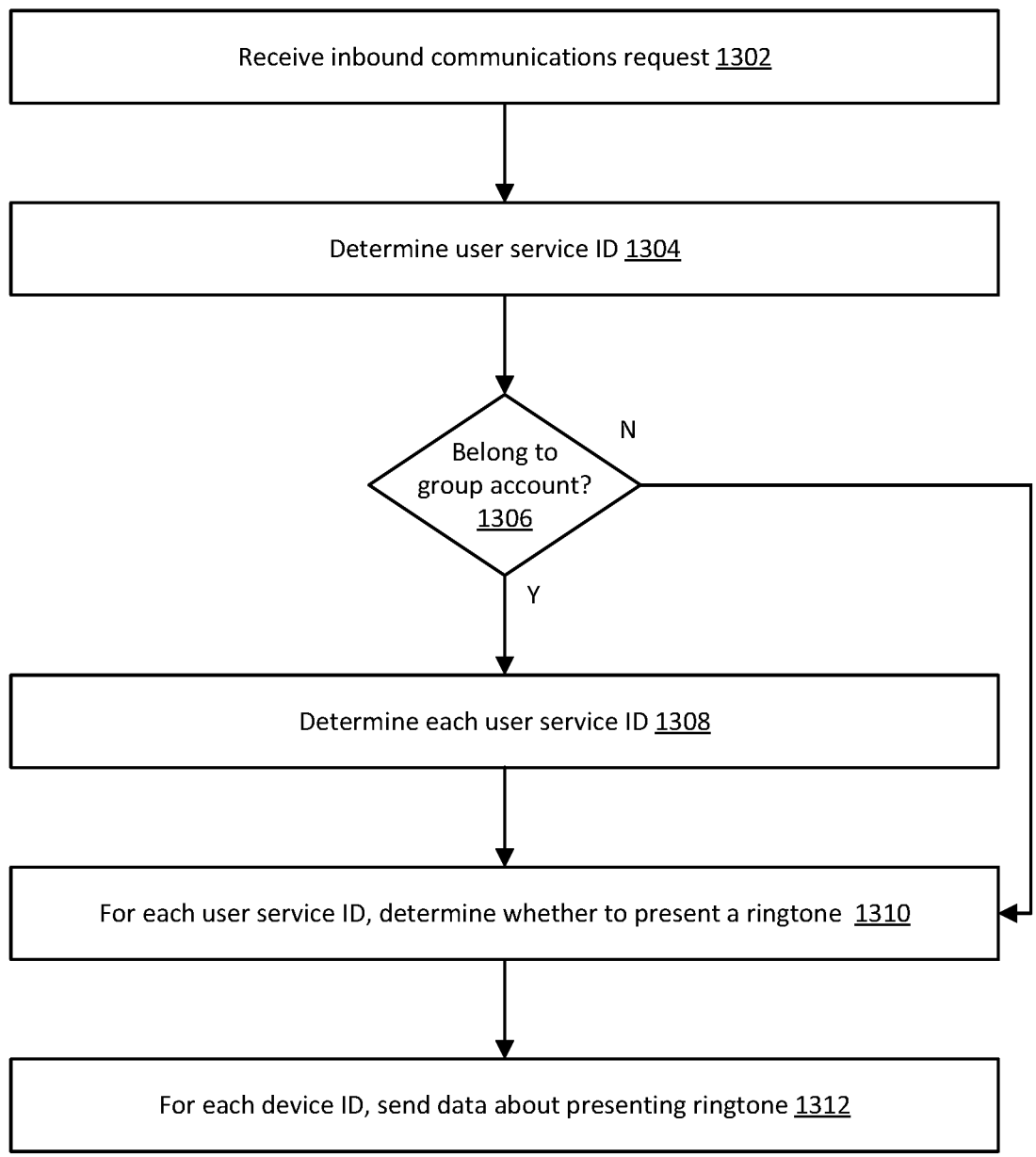
FIG. 13 illustrates an example flow managing notifications based on a group account, according to certain embodiments of the present disclosure.

FIG. 13 illustrates an example flow managing notifications based on a group account, according to certain embodiments of the present disclosure. In an example, the flow may start at operation 1302, where the computer system receives an inbound communications request.

At operation 1304, the computer system determines a user service identifier. For example, the request includes a user carrier identifier. The computer system uses the user carrier identifier to look up user accounts, identify a user account that stores the user carrier identifier, and retrieve the user service identifier from this user account.

At operation 1306, the computer system determines whether the user account belongs to a group account. For example, the computer system checks whether the user account is registered under any group account. If so, operation 1308 may follow operation 1306. Otherwise, operation 1310 may be performed.

At operation 1308, the computer system determines each user service identifier associated with the group account. For instance, the computer system accesses each user account that belongs to the group account and retrieves the user service identifier stored in each user account.

At operation 1310, the computer system determines, for each user service identifier, whether a ringtone is to be presented. For example, the computer system retrieves the override data corresponding to each user identifier and determines whether the override data indicates that a DND setting is to be overridden.

At operation 1312, the computer system sends, for each device identifier, data about presenting the ringtone. For example, for each user service identifier corresponding to a user account, the computer system determines one or more device identifiers stored in the user account. Each of such device identifiers correspond to a user device registered under the user account. Based on the override data, the computer system generates and sends data to each user device instructing this device about whether to present a ringtone or not as applicable.

Figure 14:
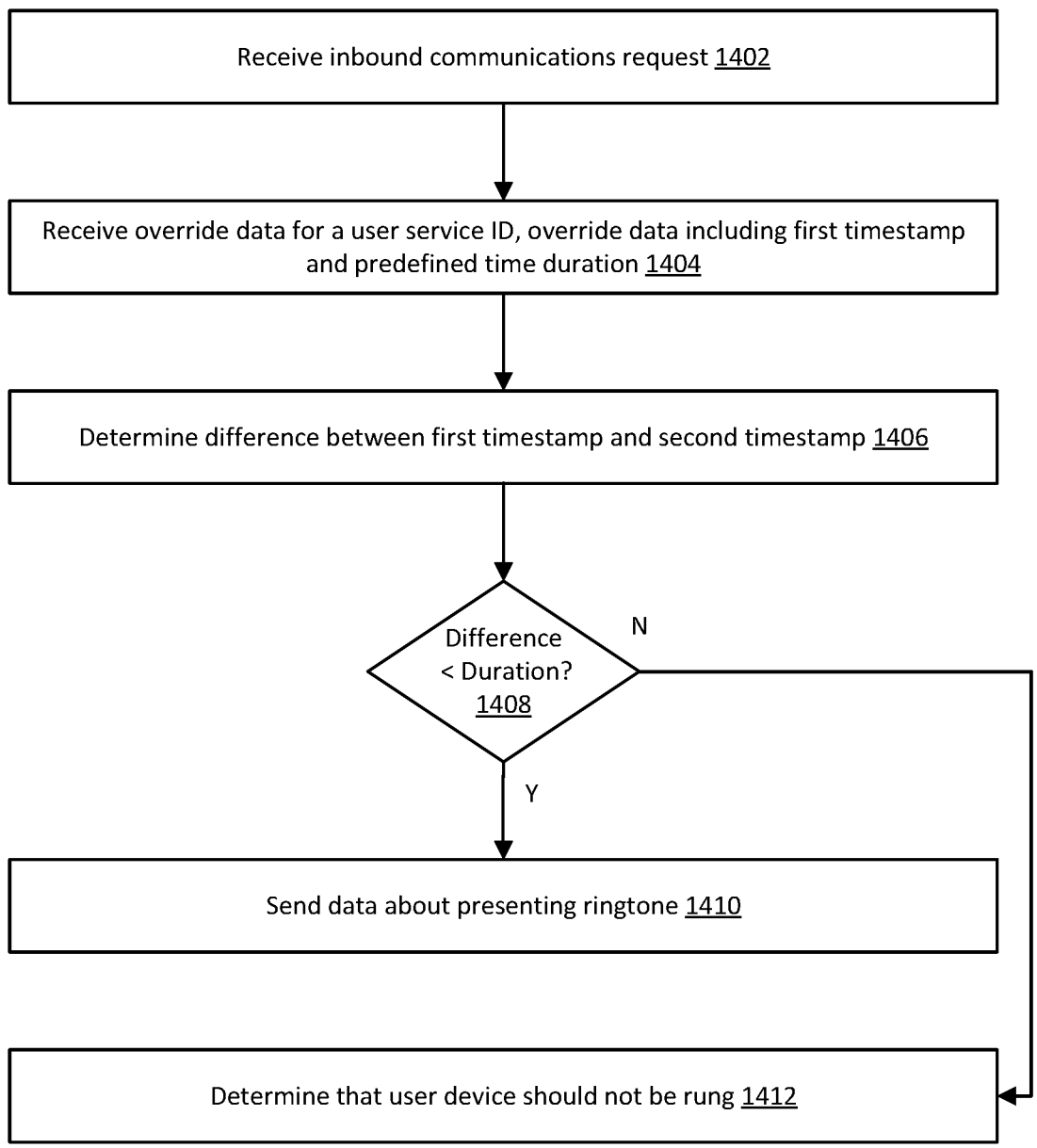
FIG. 14 illustrates an example flow for determining whether a notification is to be presented based on override data, according to certain embodiments of the present disclosure.

FIG. 14 illustrates an example flow for determining whether a notification is to be presented based on override data, according to certain embodiments of the present disclosure. In an example, the flow may start at operation 1402, where the computer system receives an inbound communications request.

At operation 1404, the computer system receives override data for a user service identifier. For example, the computer system determines the user service identifier based on the inbound communications request and retrieves the override data corresponding to this identifier. The override data includes a first timestamp and a predefined time duration. The user identifier may be associated with a device identifier of a user device under a user account.

At operation 1406, the computer system determines a difference between the first timestamp and a second timestamp. In an example, the second timestamp corresponds to a time when the inbound communications request was received.

At operation 1408, the computer system determines whether the difference is less than the predefined time duration. If so, operation 1410 may follow operation 1408. Otherwise, operation 1412 may be performed.

At operation 1410, the computer system sends, to the user device, data about presenting a ringtone. This data can instruct the user device to present the ringtone and can set a volume, a pattern, and/or a time length for the presentation.

At operation 1412, the computer system determines that the user device is not to be rung. Accordingly, the computer system may not generate or send the data about presenting the ringtone.

Figure 15:
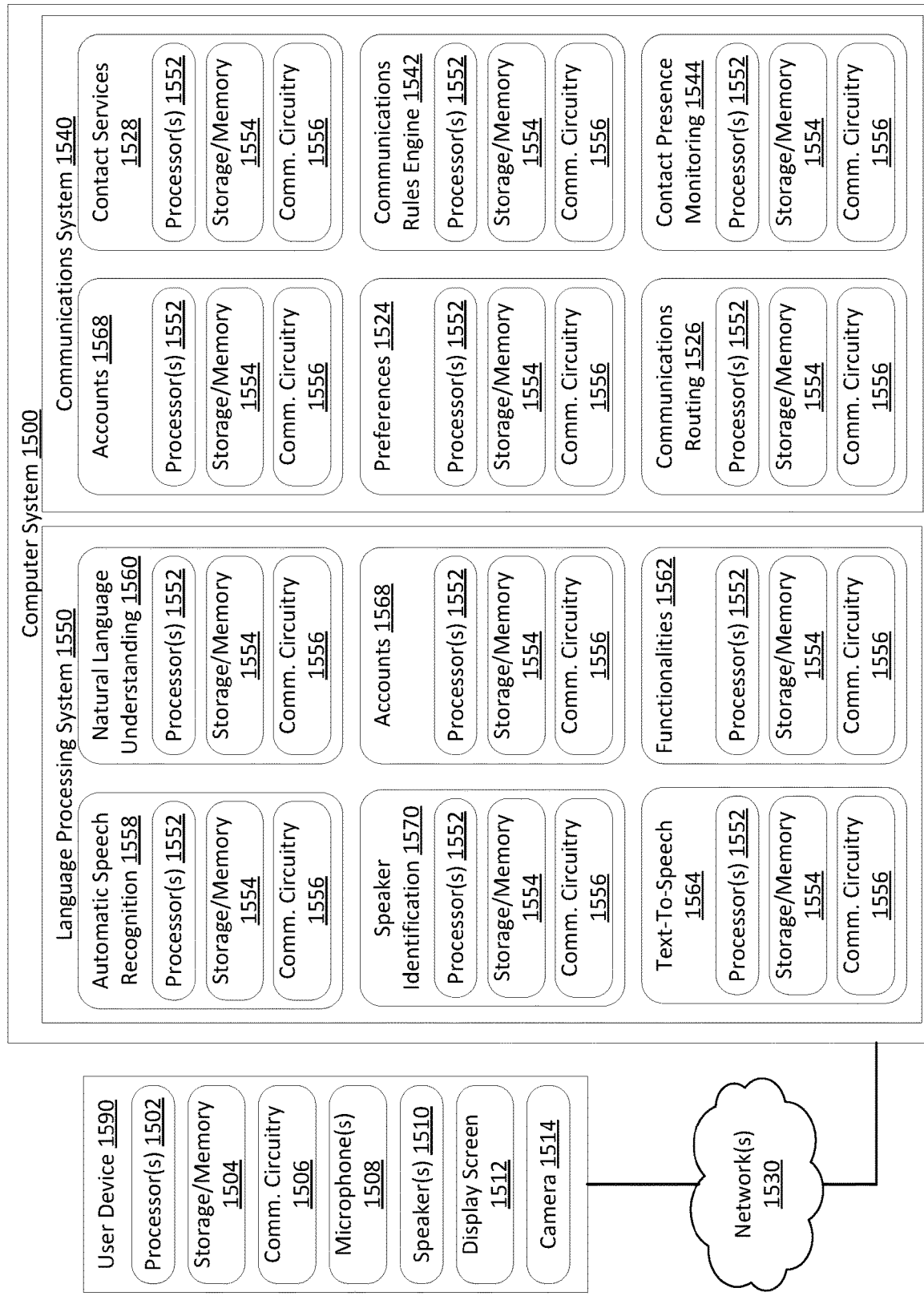
FIG. 15 illustrates an example system architecture of a user device and a computer system, according to certain embodiments of the present disclosure.

FIG. 15 illustrates an example system architecture of a user device and a computer system, according to certain embodiments of the present disclosure. As illustrated, a user device 1590 may be configured to communicate with a computer system 1500, and in particular with a language processing system 1550, in response to detecting an utterance including a wakeword, which may subsequently be followed by a request/question/statement. Similarly, the user device 1590 may alternatively or additionally include one or more manually activated components for manually activated capabilities. In this particular scenario, the user device 1590 may also be configured, in some embodiments, to communicate with the language processing system 1550, in response to a manual input being detected by one or more input mechanisms, such as a touch screen, a button, and/or a switch, for example. The computer system 1500 is an example of the computer system 120 of FIG. 1 and the computer system 220 of FIG. 2. The user device 1590 is usable to initiate and receive communications and is an example of the VCD 210 of FIG. 2.

In non-limiting embodiments, the user device 1590 may be capable of being activated in response to detecting a specific sound, such as a wakeword. After detecting a specific sound (e.g., a wakeword or trigger expression), the user device 1590 may recognize commands (e.g., audible commands, inputs) within captured audio, and may perform one or more actions in response to the received commands. Furthermore, the user device 1590 may also be configured to perform one or more actions in response to detecting a particular touch, or mechanical, input(s) via the user device 1590.

The user device 1590 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices, personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), VCDs, VCMDs, smart appliances, smart home monitoring system (e.g., a video security system) and/or smart accessories (e.g., light bulbs, light switches, electrical switches, etc.). In some embodiments, the user device 1590 may be relatively simple or basic in structure such that no, or a minimal number of, mechanical input option(s) (e.g., keyboard, mouse, track pad) or touch input(s) (e.g., touch screen, buttons) are included. For example, the user device 1590 may be able to receive and output audio, and may include power, processing capabilities, storage/memory capabilities, and communication capabilities. However, in other embodiments, the user device 1590 may include one or more components for receiving mechanical inputs or touch inputs, such as a touch screen and/or one or more buttons.

The user device 1590, in some embodiments, may include a minimal number of input mechanisms (e.g., a power on/off switch) such that functionality of the user device 1590 may solely or primarily be through audio input and audio output. For example, the user device 1590 may include, or be in communication with, one or more microphones that listen for a wakeword by continually monitoring local audio. In response to the wakeword being detected, the user device 1590 may establish a connection with the language processing system 1550 (such as through a network(s) 1530), send audio data to the language processing system 1550, and await/receive a response from the language processing system 1550. In some embodiments, however, non-voice/sound activated devices may also communicate with the language processing system 1550 (e.g., push-to-talk devices). For example, in response to a button or touch screen being pressed, or a button or touch screen being pressed and held, a microphone associated with the user device 1590 may begin recording local audio, establish a connection with the language processing system 1550, send audio data representing the captured audio to the language processing system 1550, and await/receive a response, and/or action to be occur, from the language processing system 1550.

It may be recognized that although in the illustrative embodiment shown in FIG. 15, the computer system 1500 includes the language processing system 1550, this is merely exemplary, and the language processing system 1550 may be separate from the computer system 1500. For example, the language processing system 1550 may be located within a dedicated computing device (such as one or more separate server(s), or within the user device 1590) or computing system, which may or may not be in communication with the computer system 1500 and/or one or more additional devices.

The user device 1590 may include one or more processors 1502, storage/memory 1504, communications circuitry 1506, one or more microphones 1508 or other audio input devices (e.g., transducers), one or more speakers 1510 or other audio output devices, a display screen 1512, and one or more cameras 1514 or other image capturing components. However, one or more additional components may be included within the user device 1590, and/or one or more components may be omitted. For example, the user device 1590 may also include a power supply or a bus connector. As still yet another example, the user device 1590 may include one or more additional input and/or output mechanisms, such as one or more buttons, or one or more switches or knobs. Furthermore, while the user device 1590 may include multiple instances of one or more components, for simplicity only one of each component has been shown.

In some embodiments, the user device 1590 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, the user device 1590 may be in communication with an additional processing device including one or more of: processor(s) 1502, storage/memory 1504, communications circuitry 1506, microphone(s) 1508, speaker(s) 1510, display screen 1512, and/or camera(s) 1514. For example, a centralized control device of the user device 1590 may include one or more microphone(s) 1508. These microphone(s) 1508 may receive audio input signals, which in turn may be sent to the language processing system 1550 in response to a wakeword engine of the user device 1590 determining that a wakeword was uttered.

The processor(s) 1502 may include any suitable processing circuitry capable of controlling operations and functionality of the user device 1590, as well as facilitating communications between various components within the user device 1590. In some embodiments, the processor(s) 1502 may include a central processing unit ("CPU"), a graphic processing unit ("GPU"), one or more microprocessors, a digital signal processor, or any other type of processor, or any combination thereof. In some embodiments, the functionality of the processor(s) 1502 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 1502 may include its own local memory, which may store program systems, program data, and/or one or more operating systems. However, the processor(s) 1502 may run an operating system ("OS") for the user device 1590, and/or one or more firmware applications, media applications, and/or applications resident thereon. In some embodiments, the processor(s) 1502 may run a local client script for reading and rendering content received from one or more websites. For example, the processor(s) 1502 may run a local JavaScript client for rendering HTML or XHTML content received from a particular URL accessed by the user device 1590.

The storage/memory 1504 may include one or more types of storage mediums such as any volatile or non-volatile memory, or any removable or non-removable memory implemented in any suitable manner to store data for the user device 1590. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory 1504 may be implemented as computer-readable storage media ("CRSM"), which may be any available physical media accessible by processor(s) 1502 to execute one or more instructions stored within the storage/memory 1504. In some embodiments, one or more applications (e.g., gaming, music, video, calendars, lists, etc.) may be run by the processor(s) 1502, and may be stored in the memory 1504.

In some embodiments, the storage/memory 1504 may include a media system, which may be configured to facilitate communications between the user device 1590 and the computer system 1500. For example, the media system may store one or more communications protocols that may be executed by the processor(s) 1502 for facilitating communications for the user device 1590. In some embodiments, a sessions initiation protocol ("SIP") may be used to facilitate media transfer between the user device 1590 and one or more of the computer system and a second user device 1590. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the user device 1590. In some embodiments, a Web Real-Time Communications ("WebRTC") protocols may be employed by the user device 1590. In a non-limiting embodiment, the media system may include instructions that indicate which communications protocols to employ for facilitating media transfer between devices based on a device type of the user device 1590. For example, if the user device 1590 does not include the display 1512 and/or camera 1514, the media system may indicate that PJSIP should be used, whereas if the user device 1590 includes the display 1512 and/or camera 1514, the media system may indicate that WebRTC protocols should be used.

In some embodiments, the storage/memory 1504 may include one or more systems and/or databases, such as a speech recognition system, a wakeword database, a sound profile database, and a wakeword detection system. The speech recognition system may, for example, include an automatic speech recognition ("ASR") component 1558 that recognizes human speech in detected audio signals and converts the audio signals to text data. The speech recognition system may also include a natural language understanding ("NLU") component 1560 that determines user intent based on the text data it receives from ASR. Also included within the speech recognition system may be a text-to-speech ("TTS") component 1564 that is capable of converting text to speech to be outputted by the speaker(s) 1510 in the user device 1590, and/or a speech-to-text ("STT") component capable of converting received audio signals into text to be sent to the language processing system 1550 for processing.

The wakeword database may be a database stored locally by the storage/memory 1504 of the user device 1590, and may include a list of a current wakewords for the user device 1590, as well as one or more previously used, or alternative, wakewords for the voice activated user device 1590. In some embodiments, an individual may set or program a wakeword for their user device 1590. The wakeword may be programmed directly on the user device 1590, or a wakeword or wakewords may be set by the individual via a local client application that is in communication with computer system 1500 and/or language processing system 1550. For example, an individual may use their mobile device having the speech-processing system application running thereon to set the wakeword. The specific wakeword may then be communicated from the mobile device to the language processing system 1550, which in turn may send/notify the user device 1590 of the individual's selection for the wakeword. The selected activation may then be stored in the wakeword database of the storage/memory 1504. In some embodiments, additional trigger expressions or permutations of the wakeword may also be stored within the storage/memory 1504. For example, specific trigger expressions or words that indicate the presence of the wakeword may also be stored within the storage/memory 1504. In some embodiments, audio watermarks, indicating a specific action or message, may also be stored within the storage/memory 1504.

In some embodiments, sound profiles for different words, phrases, commands, or audio compositions are also capable of being stored within the storage/memory 1504, such as within a sound profile database. For example, a sound profile of audio may be stored within the sound profile database of the storage/memory 1504 on the user device 1590. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by the microphone(s) 1508 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s) 1508. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by the microphone(s) 1508. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the user device 1590 may then begin transmitting the audio signal to the language processing system 1550 for detecting and responds to subsequent utterances made by an individual.

In some embodiments, the storage/memory 1504 may store voice biometric data associated with one or more individuals. For example, an individual that operates the user device 1590 may have a registered user account on the computer system 1500 (e.g., within accounts system 1568). In some embodiments, the user device 1590 may be associated with a group account, and various individuals may have user accounts that are operating under the rules and configurations of the group account. As an illustrative example, an initiating user device 1590 (e.g., the initiating device 210 of FIG. 2) may be associated with a first group account on the computer system 1500, the first group account being for a family that lives at a household where first shared electronic device is located. Each family member may also have a user account that is linked to the first group account (e.g., a parent, a child, etc.), and therefore each user account may obtain some or all of the rights of the first group account. For example, the user device 1590 may have a first group account on the computer system 1500 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, a voice print of that audio data may be generated using speaker identification functionality stored within the storage/memory 1504. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow user device 1590 to attempt and identify a speaker of a particular utterance locally. However, persons of ordinary skill in the art will recognize that the user device 1590 may not perform speaker identification processing, and alternatively speaker identification processing may be performed by the computer system 1500 (e.g., a speaker identification system 1570), or no speaker identification processing may be performed all together.

The communications circuitry 1506 may include any circuitry allowing or enabling one or more components of the user device 1590 to communicate with one another, or with one or more additional devices, servers, and/or systems. For example, the communications circuitry 1506 may facilitate communications between the user device 1590 and the computer system 1500. As an illustrative example, audio data representing an utterance may be transmitted over the network(s) 1530, such as the Internet, to the computer system 1500 using any number of communications protocols. For example, the network(s) 1530 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the user device 1590 and the computer system 1500. In some embodiments, the user device 1590 and computer system 1500 and/or one or more additional devices or systems (e.g., the language processing system 1550) may communicate with one another via a web browser using HTTP. Various additional communication protocols may be used to facilitate communications between the user device 1590 and computer system 1500, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 15GSM, DECT, IS-136/TDMA, iDen, LTE or any other suitable cellular network protocol), infrared, BitTorrent, FTP, RTP, RTSP, SSH, and/or VOIP.

The communications circuitry 1506 may use any communications protocol, such as any of the previously mentioned exemplary communications protocols. In some embodiments, the user device 1590 may include an antenna to facilitate wireless communications with a network using various wireless technologies (e.g., Wi-Fi, Bluetooth, radiofrequency, etc.). In yet another embodiment, the user device 1590 may include one or more universal serial bus ("USB") ports, one or more Ethernet or broadband ports, and/or any other type of hardwire access port so that the communications circuitry 1506 allows the user device 1590 to communicate with one or more communications networks.

The user device 1590 may also include one or more microphones 1508 and/or transducers. Furthermore, one or more microphones located within a separate device may be in communication with the user device 1590 to capture sounds for the user device 1590. The Microphone(s) 1508 may be any suitable component capable of detecting audio signals. For example, the microphone(s) 1508 may include one or more sensors for generating electrical signals and circuitry capable of processing the generated electrical signals. In some embodiments, the microphone(s) 1508 may include multiple microphones capable of detecting various frequency levels. As an illustrative example, the user device 1590 may include multiple microphones (e.g., four, seven, ten, etc.) placed at various positions about the user device 1590 to monitor/capture any audio outputted in the environment where the user device 1590 is located. The various microphones 1508 may include some microphones optimized for distant sounds, while some microphones may be optimized for sounds occurring within a close range of the user device 1590. In some embodiments, the microphone(s) 1508 may only begin to detect audio signals in response to a manual input to user device 1590. For example, a manually activated device may begin to capture audio data using the microphone(s) 1508 in response to a user input, such as pressing a button, tapping a touch screen, or providing any touch input gesture to a touch input component.

The user device 1590 may include one or more speakers 1510. Furthermore, the user device 1590 may be in communication with one or more speaker(s) 1510. The speaker(s) 1510 may correspond to any suitable mechanism for outputting audio signals. For example, the speaker(s) 1510 may include one or more speaker units, speaker housings, transducers, arrays of speakers, and/or arrays of transducers that may be capable of broadcasting audio signals and or audio content to a surrounding area where user device 1590 may be located. In some embodiments, the speaker(s) 1510 may include headphones or ear buds, which may be wirelessly wired, or hard-wired, to the user device 1590, that may be capable of broadcasting audio directly to an individual.

In some embodiments, the one or more microphones 1508 may serve as input devices to receive audio inputs. The user device 1590, in the previously mentioned embodiment, may then also include the one or more speakers 1510 to output audible responses. In this manner, the user device 1590 may function solely through speech or audio, without the need for any input mechanisms or displays, however this is merely exemplary.

The display screen 1512 may correspond to a display device and/or touch screen, which may be any size and/or shape and may be located at any portion of the user device 1590. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen 1512 may correspond to a projected capacitive touch ("PCT"), screen include one or more row traces and/or driving line traces, as well as one or more column traces and/or sensing lines. In some embodiments, the display screen 1512 may be an optional component for the user device 1590. For instance, the user device 1590 may not include the display screen 1512. Such devices, sometimes referred to as "headless" devices, may output audio, or may be in communication with a display device for outputting viewable content.

The display screen 1512, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen 1512, a capacitance between the object and the conductive material may be formed. The processor(s) 1502 may be capable of determining a location of the touch screen associated with where the capacitance change is detected, and may register a touch input as occurring at that location.

In some embodiments, the display screen 1512 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen 1512 corresponding to where a conductive object contacted display screen 1512.

A change in capacitance may be measured to determine a location on the touch screen where the object has contacted the surface. For example, if an individual touches a point on display screen 1512, then a corresponding driving line and sensing line that intersect at that point may be identified. A location of the point may have one or more pixels associated with that location, and therefore one or more actions may be registered for an item or items that are displayed at that location. The processor(s) 1502 of the user device 1590 may be configured to determine which pixels are associated with a particular location point, and which item or items are also displayed at that pixel location. Furthermore, the user device 1590 may be configured to cause one or more additional actions to occur to the item or items being displayed on the display screen 1512 based on a temporal duration the touch input, and or if one or more additional touch inputs are detected. For example, an object that contacted display screen 1512 at a first location may be determined, at a later point in time, to contact the display screen 1512 at a second location. In the illustrative example, an object may have initially contacted display screen 1512 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 1512 having 100 driving lines and 100 sensing lines may have 100 intersection points, and therefore 100 individual capacitors, while a touch screen display screen 1512 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the user device 1590, and therefore the fewer driving lines and/or sensing lines used, the smaller the amount of power that is needed to operate the touch screen display.

In some embodiments, the display screen 1512 may correspond to a high-definition ("HD") display. For example, the display screen 1512 may display images and/or videos of 720p, 1080p, 1080i, or any other image resolution. In these particular scenarios, the display screen 1512 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 15,073,600 pixels. However, persons of ordinary skill in the art will recognize that the aforementioned display ratios and pixel numbers are merely exemplary, and any suitable display resolution or pixel number may be employed for the display screen 1512, such as non-HD displays, 4K displays, and/or ultra-displays.

In some embodiments, the user device 1590 may include one or more cameras 1514, corresponding to any suitable image capturing component or components capable of capturing one or more images and/or videos. The camera(s) 1514 may, in some embodiments, be configured to capture photographs, sequences of photographs, rapid shots (e.g., multiple photographs captured sequentially during a relatively small temporal duration), videos, or any other type of image, or any combination thereof. In some embodiments, the user device 1590 may include multiple the cameras 1514, such as one or more front-facing cameras and/or one or more rear facing cameras. Furthermore, the camera(s) 1514 may be configured to recognize far-field imagery (e.g., objects located at a large distance away from the user device 1590) or near-filed imagery (e.g., objected located at a relatively small distance from the user device 1590). In some embodiments, the camera(s) may be high-definition ("HD") cameras, capable of obtaining images and/or videos at a substantially large resolution (e.g., 726p, 1080p, 1080i, etc.). In some embodiments, the camera(s) 1514 may be optional for the user device 1590. For instance, the camera(s) 1514 may be external to, and in communication with, the user device 1590. For example, an external camera may be capable of capturing images and/or video, which may then be provided to the user device 1590 for viewing and/or processing.

Persons of ordinary skill in the art will recognize that, in some embodiments, the display screen 1512 and/or camera(s) 1514 may be optional for the user device 1590. For instance, the user device 1590 may function using audio inputs and outputting audio, and therefore the display screen 1512 and/or camera(s) 1514 may not be included. Furthermore, in some embodiments, the user device 1590 may not include the display screen 1512 and/or camera(s) 1514, but instead may be in communication with the display screen 1512 and/or camera(s) 1514. For example, the user device 1590 may be connected to a display screen via a Wi-Fi (e.g., 802.11 protocol) connection such that visual content sent to the user device 1590 may be sent to the display screen, and output thereby.

In some exemplary embodiments, the user device 1590 may include an additional input/output ("I/O") interface. For example, the user device 1590 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the user device 1590 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the user device 1590. For example, one or more LED lights may be included on the user device 1590 such that, when the microphone(s) 1508 receive audio, the one or more LED lights become illuminated signifying that audio has been received by the user device 1590. In some embodiments, one or more vibrating mechanisms or other haptic features may be included with the user device 1590 to provide a haptic response to an individual.

In some embodiments, the user device 1590 may include radio-frequency identification ("RFID") functionality and/or near field communication ("NFC") functionality. Furthermore, in some embodiments, the user device 1590 may include one or more infrared ("IR") sensors and one or more IR emitters. The IR sensors/emitters may be used to determine depth information. For example, in one embodiment, a distance of an individual from the user device 1590 may be determined using the one or more IR sensors/emitters. Depth determination may be performed using any depth determination technique. In some embodiments, a distance between an individual and the user device 1590 may be employed as a basis for presenting content with varying density using the display screen 1512. For example, when an individual is at a distance A from the user device 1590, the user device 1590 may display weather data for a current day. However as the user moves closer to the user device 1590, such as at a distance B from the user device 1590, which may be less than distance A, the user device 1590 may display weather data for a current week. For instance, as the individual gets closer to the user device 1590, the ability of the individual to see denser content increases, and as the individual moves father away from the user device 1590, the individual's ability to see denser content decreases. This, for example, may ensure that the content displayed by the user device 1590 is continually relevant and readable by the individual.

The computer system 1500, in non-limiting, exemplary embodiments, may include the language processing system 1550. The language processing system 1500 is an example of the language processing system 122 of FIG. 1. However, in other embodiments, the language processing system 1550 may be separate from, or in communication with, the computer system 1500. Generally, the language processing system 1550 may, in some embodiments, include one or more remote devices capable of receiving and sending content from/to one or more electronic device, such as the user device 1590. The language processing system 1550 may include various components and systems including, but not limited to, automatic speech recognition ("ASR") system 1558, natural language understanding ("NLU") system 1560, functionalities system 1562, text-to-speech ("TTS") system 1564, and accounts system 1568. In some embodiments, language processing system 1550 may also include computer readable media, including, but not limited to, flash memory, random access memory ("RAM"), and/or read-only memory ("ROM"). The language processing system 1550 may also include various systems that store software, hardware, logic, instructions, and/or commands for the language processing system 1550, such as a speaker identification ("ID") system 1570, or any other system, or any combination thereof.

The ASR system 1558 may be configured to recognize human speech in audio signals received from the user device 1590, such as audio captured by the microphone(s) 1508, which may then be transmitted to the language processing system 1550. The ASR system 1558 may include, in some embodiments, one or more processor(s) 1552, storage/memory 1554, and communications circuitry 1556. The processor(s) 1552, storage/memory 1554, and communications circuitry 1556 may, in some embodiments, be substantially similar to the processor(s) 1502, storage/memory 1504, and communications circuitry 1506, which are described in greater detail above, and the aforementioned descriptions may apply. In some embodiments, the ASR system 1558 may include speech-to-text ("STT") system 1564. The STT system 1564 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 1558 may include an expression detector that analyzes audio signals received by the language processing system 1550, such as the expression detector mentioned above with regards to the user device 1590. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

The NLU system 1560 may be configured such that it determines user intent based on the text data is receives from the ASR system 1558. For example, the NLU system 1560 may determine that the intent of utterance is for initiating a communications session with a device, associated with a particular name (e.g., initiate a communications session with "Alice"). In response to determining the intent of the utterance, the NLU system 1560 may communicate the received command to an appropriate subject matter server or skill on the functionalities system 1562 to perform one or more tasks, and/or retrieve an appropriate response or response information. The NLU system 1560 may include processor(s) 1552, storage/memory 1554, and communications circuitry 1556 which, in one embodiment, may be substantially similar to the processor(s) 1502, storage/memory 1504, and communications circuitry 1506 of the user device 1590, and the previous description may apply.

The functionalities system 1562 (also referred to as speechlets module 1562) may, for example, correspond to various action specific systems or servers, sometimes referred to as "skills," capable of processing various task specific actions. The functionalities system 1562 may further correspond to first party applications and/or third party applications capable of performing various tasks or actions. For example, based on the context of the audio data received from the user device 1590, the language processing system 1550 may use a certain functionality to generate a response, or to obtain response information, which in turn may be communicated back to the user device 1590. For instance, an utterance may ask for weather information, and therefore the functionalities system 1562 may access a weather application to obtain current weather information for a location associated with the user device 1590. The functionalities system 1562 may also include processor(s) 1552, storage/memory 1554, and communications circuitry 1556.

The TTS system 1564 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 1564 may also include processor(s) 1552, storage/memory 1554, and communications circuitry 1556.

The accounts system 1568 may store one or more user accounts corresponding to users having a registered account on the computer system 1500. For example, a parent may have a registered account on the computer system 1500, and each of the parent's children may have their own user account registered under the parent's registered account. The accounts system 1568 may also store one or more group accounts corresponding to one or more shared devices. For example, a shared device, such as shared the user device 1590, may have its own group account stored on the accounts system 1568. The group account may be associated with the shared device, and may also be linked to one or more individual's user accounts. For example, the shared user device 1590 may be associated with a first group account corresponding to a first grouping of individual (e.g., a family). One or more user accounts may also be associated with the first group account (e.g., individual members of the family), corresponding to individuals that may be capable of interacting with the shared user device 1590. Information, permissions (e.g., for Drop Ins), settings, and/or preferences, for example, for each user account may be stored within a user account database. In some embodiments, the accounts system 1568 may store a voice signal, such as voice biometric information, for a specific user account. This may allow speaker identification techniques to be used to match a voice-to-voice biometric data associated with a specific user account. In some embodiments, the accounts system 1568 may store a telephone number assigned to a particular user account, a device identifier associated with a particular device, a communications identifier associated with a particular user account and/or group account, or any other suitable information, or any combination thereof.

It should also be recognized that although each of the ASR system 1558, NLU system 1560, subject matter/skills system 1562, TTS system 1564, and accounts system 1568 may each include instances of the processor(s) 1552, storage/memory 1554, and communications circuitry 1556, and those instances of processor(s) 1552, storage/memory 1554, and communications circuitry 1556 within each of the ASR system 1558, NLU system 1560, functionalities system 1562, TTS system 1564, and accounts system 1568 may differ. For example, the structure, functionality, and style of the processor(s) 1552 within ASR system 1558 may be substantially similar to the structure, functionality, and style of the processor(s) 1552 within NLU system 1560, however the actual processor(s) 1552 need not be the same entity.

The computer system 1500 may also include, in a non-limiting embodiment, a communications system 1540, which may be configured to facilitate communications between two or more user devices 1590. The communications system 1450 is an example of the communications system 121 of FIG. 1 and the communications system 221 of FIG. 2. For example, the communications system 1540 may be capable of facilitating a communications session between an initiating user device and a recipient user device and may include one or more calling agents and gateways nodes for communications session over PSTV or other types of communications network systems. Upon the language processing system 1550 determining that an intent of an utterance is for a communications session to be established between the user device 1590 and another device, the user device 1590 may access the communications system 1540 to facilitate the communications session. For example, the communications system 1540 may employ VoIP functionality to facilitate audio, video, and/or text data communications between the initiating user device and the recipient user device.

As an illustrative example, a communications session between two devices is described below to illustrate how the communications session may be established. In one example embodiment, an individual (e.g., a caller) may speak an utterance (e.g., "Alexa, send a message to Alice: 'Want to have dinner at my place?'") to their user device 1590 (e.g., the initiating user device 210). In response to detecting the device's wakeword (e.g., "Alexa"), the user device 1590 may begin sending audio data representing the utterance to the computer system 1500, and in particular to the language processing system 1550. Upon receipt, the ASR system 1558 may perform speech recognition processing, such as speech-to-text processing, to the audio data to generate text data representing the audio data. The text data may then be passed to the NLU system 1560 to determine the intent of the utterance. For example, the NLU system 1560 may include a listing of sample utterances to be used to disambiguate the spoken words and determine an action intended to occur for the utterance. In some embodiments, a messaging speechlet system may be included within the NLU system 1560 that includes one or more sample utterance frameworks. If the format of the spoken utterance substantially matches one of these sample utterances, then that may indicate that the intent of the utterance was for a communications session to be initiated. For instance, one sample utterance may be "{Wakeword}, send a message to {Contact Name}: {Message}." If the framework of the spoken utterance's text data substantially matches this sample utterance framework, the NLU system 1560 may determine that the intent of the utterance was to start a communications session with a contact of the user, and NLU may also determine that the intended target of the communications session is "Alice"

(e.g., {Contact Name}: Alice). After determining that a message is to be sent to a contact named "Alice," the communications system 1540 may rely on a contact services system 1528 that accesses the accounts system 1568 determines whether any device identifiers (e.g., a device address) are associated with the contact, "Alice." If multiple devices are determined, the communications system 1540 may access a preferences system 1524 that stores preferences of the contact for using the different devices and a contact presence monitoring system 1544 that detects the presence of the contact relative to these devices and provides proximity information. The communications system 1540 identifies a particular device or a particular subset of the devices that communications with which the communications can be initiated. Similarly, if an inbound communications request is associated with a user account that stores multiple device identifiers, a subset or all of the user devices can be rung.

In some embodiments, the communications system 1540 may establish a communications session between an initiating device 1590 and a recipient device 1590 using one or more VoIP protocols including, but not limited to SIP, RTP, RTCP, SRTP, and SDP or other communication protocols implemented by a communications routing service 1526. In one illustrative embodiment, a SIP signaling command may be provided to the communications system 1540 for communicating with the recipient device. In particular, PJSIP functionality adds a new "user-to-user" header that indicates the device pair for the communications session.

In some embodiments, the communications system 1540 may include a communication rules engine 1542 that may store various rules for how certain communications between group accounts and user accounts are to behave and that may store device information for different user devices. For example, the communications rules engine 1542 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. Other parameters relate to the device information, such as device type identifier, software version, and status. In some illustrative embodiments, the communication rules engine 1542 may store a communications table indicating various device identifiers, group account identifiers, communication identifiers, and device types for various devices interacting with the communications system. In addition, the communication rules engine 1542 may generate content, such as TTS audio, based on an identifier of the user device 1590, where this content can identify a party initiating a communications session (e.g., the caller and/or the user device 1590).

In some embodiments, the communications system 1540 may also include a message data store that may correspond to any suitable type of storage/memory, such as that of the storage/memory 1504, 1554, that is capable of storing one or more messages sent/received, including the content about the initiating party. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system 1540 may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 1568. This way, when an individual requests to receive messages associated with their group account, the message data store may be accessed to obtain any messages currently stored thereby that are associated with that group account's group account identifier.

The computer system 1500 may also include, in some embodiments, a speaker identification system 1570 that may correspond to any suitable device/system capable of identifying a particular person's voice from an audio signal. The speaker identification system 1570 may determine whether a current voice being used to speak matches known voice biometric data associated with a particular individual's voice. In some embodiments, voice biometric data may be stored within the accounts system 1568 for various individuals having a user account stored thereby. For example, the caller may have a user account on the computer system 1500 (e.g., stored within the accounts system 1568), which may be associated with the initiating device 210. Stored within that user account may be voice biometric data associated with a voice profile for the caller. Therefore, when an utterance is detected, and subsequently when audio data representing that utterance is received by the computer system 1500, the speaker identification system 1570 may determine whether the voice that spoke utterance matches, to at least a predefined confidence level, the stored voice biometric information associated with the caller stored by their user account. If so, then this may indicate that the caller is the likely speaker of the utterance.

The communications rules engine 1542 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system 1570 as to whether or not a speaker that spoke the utterance was identified. Using these two parameters, for instance, the communications rules engine 1542 may be configured to cause the communications system 1540 to facilitate communications between two or more devices.

In various embodiments of the present disclosure, a user has control over user-related information that can be collected and analyzed. Depending on the type of user-related information, appropriate measures are taken to ensure protection of this information, to empower the users to determine what data can be collected and analyzed, as well as empower the users to indicate which portions of the information should be deleted and/or no longer collected and/or analyzed. Further, the user has control over opting in to the communications services described herein and, if opted in, to opt out at any time. The features provided by the communication services are compliant with the applicable regulations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computer system, the method comprising:
    storing, in association with a first user account, a device identifier of a first user device;
    associating the first user account with a second user account used to access a public switched telephone network system;
    storing, in association with a device profile of the first user device, do not disturb (DND) setting data that prohibits an output of a ringtone by the first user device;
    receiving, from the first user device, a request for outbound communications to an emergency service device;
    sending, to the first user device, first data about establishing an outbound communications session with the emergency service device, the outbound communications session to be routed via the public switched telephone network system;
    storing, in a database and in response to the request, a first timestamp associated with the outbound communications session and a predefined time duration during which an override of the DND setting data is valid;
    receiving second data at a second timestamp, the second data associated with the second user account and indicating a request for inbound communications via the public switched telephone network system;
    determining the device identifier from the first user account in response to the second data;
    determining, from the device profile corresponding to the device identifier, that the DND setting data prevents the output of the ringtone;
    determining, from the database, the first timestamp and the predefined time duration;
    determining that a difference between the second timestamp and the first timestamp is less than the predefined time duration;
    determining that the DND setting data is to be overridden based on the difference; and
    sending, to the first user device, third data about outputting the ringtone.

2. The method of claim 1, wherein the first timestamp corresponds to an end of the outbound communications session, and further comprising:
    storing, in the database, a third timestamp for the override, wherein the third timestamp corresponds to a start of the outbound communications session;
    determining that a time length of the outbound communication session is larger than the predefined time duration; and
    replacing the third timestamp with the first timestamp in the database.

3. The method of claim 1, further comprising:
determining that the first user account belongs to a group account;
determining a third user account from the group account;
determining a second device identifier from the third user account, the second device identifier associated with a second user device; and
sending, to the second user device, fourth data about outputting the ringtone.

4. A computer system comprising:
one or more processors; and
one or more memories storing computer-readable instructions that, upon execution by the one or more processors, cause the computer system to:
associate a first user account with a user device;
store first data indicating that a notification about a communications session via a communications network system is prohibited for the user device;
receive a request associated with the first user account for communications with another device via the communications network system;
generate second data based at least in part on the communications with the other device, the second data indicating that the notification is permitted for the user device within a period of time of the request; and
associate the first user account with the second data.

5. The computer system of claim 4, wherein the one or more memories store further computer-readable instructions that, upon execution by the one or more processors, cause the computer system to:
associate the first user account with a second user account, the second user account used to access the communications network system;
receive a second request associated with the second user account for the communications session;
determine that the user device is a destination of the communications session based at least in part on the first user account being associated with the user device and with the second user account;
determine that the first data prohibits an output of the notification by the user device;
determine that the second data indicates that the notification is to be outputted based at least in part on the communications session being requested within the period of time; and
send, to the user device, third data about outputting the notification.

6. The computer system of claim 4, wherein generating the second data comprises:
determining the first user account based at least in part on the request;
determining a user identifier associated with the first user account; and
storing, in a database, the second data in association with the user identifier and third data, the third data associated with the communications session and representing a predefined time duration during which the second data is valid.

7. The computer system of claim 4, wherein the request is received from the user device, wherein the first data is stored in association with a device profile of the user device and indicates that the user device is prohibiting from outputting the notification, and wherein generating the second data comprises:
determining, based at least in part on the request, a device identifier associated with the user device;
determining the first user account based at least in part on the device identifier;
determining a first user identifier associated with the first user account; and
storing, in a database, the second data in association with the first user identifier and third data, the third data associated with the communications session and representing a predefined time duration during which the second data is valid.

8. The computer system of claim 7, wherein the one or more memories store further computer-readable instructions that, upon execution by the one or more processors, cause the computer system to:
determine that the first user account and a second user account are associated with a group account;
determine a second user identifier associated with the second user account; and
store, in the database, fourth data in association with the second user identifier and fifth data, the fifth data associated with the communications session and representing the predefined time duration, the fourth data indicating that the notification about the communications session is to be presented within the period of time.

9. The computer system of claim 4, wherein the request is received from a second user device associated with the first user account, wherein the first data is stored in association with a device profile of the user device and indicates that the user device is prohibited from outputting the notification, and wherein the one or more memories store further computer-readable instructions that, upon execution by the one or more processors, cause the computer system to:
store, in a database based at least in part on the second user device being associated with the first user account, the second data in association with a first user identifier and third data, the third data associated with the communications session and representing a predefined time duration during which the second data is valid.

10. The computer system of claim 4, wherein the first data is stored in association with a device profile of the user device and indicates that the user device is prohibited from outputting the notification, wherein the request is received from a second user device associated with a second user account, and wherein generating the second data comprises:
determining that the first user account and the second user account are associated with a group account;
determining a first user identifier associated with the first user account; and
storing, in a database, the second data in association with the first user identifier and third data, the third data associated with the communications session and representing a predefined time duration during which the second data is valid.

11. The computer system of claim 4, wherein the first data is stored in association with a device profile of the user device and indicates that the user device is prohibited from outputting the notification, wherein the request is received from a second user device associated with the first user account, and wherein generating the second data comprises:
determining the first user account based at least in part on the request;
determining a user identifier associated with the first user account; and
storing, in a database, the second data in association with the user identifier and third data, the third data associated with the communications session and representing a predefined time duration during which the second data is valid.

12. The computer system of claim 4, wherein the one or more memories store further computer-readable instructions that, upon execution by the one or more processors, cause the computer system to:
   send, to the user device, audio data indicating that the first data is overridden for a predefined time duration.

13. The computer system of claim 4, wherein the one or more memories store further computer-readable instructions that, upon execution by the one or more processors, cause the computer system to:
   receive user input data indicating a contact associated with other device; and
   update a contacts list associated with the first user account to identify the contact based at least in part on the user input data, and wherein generating the second data comprises determining a match between the contacts list and the request.

14. A method implemented by a computer system, the method comprising:
   associating a first user account with a user device;
   storing first data indicating that a notification about a communications session via a communications network system is prohibited for the user device;
   receiving a first request associated with the first user account for communications with another device via the communications network system;
   generating second data based at least in part on the communications with the other device, the second data indicating that the notification is permitted for the user device within a period of time of the first request;
   receiving a second request for the communications session;
   determining that the user device is a destination of the communications session based at least in part on the first user account being associated with the user device;
   determining that the first data prohibits an output of the notification by the user device;
   determining that the second data permits the output of the notification by the user device based at least in part on timing of the second request being within the period of time; and
   sending, to the user device, third data about outputting the notification.

15. The method of claim 14, further comprising:
   associating the first user account with a second user account, the second user account used to access the communications network system; and
   prior to receiving the second request, receiving the first request, the second data comprising a user identifier associated with the first user account, a timestamp associated with the communications, and a predefined time duration during which the second data is valid.

16. The method of claim 14, further comprising:
   determining a user identifier based at least in part on the first user account;
   determining that the second data includes the user identifier, a first timestamp, and a predefined time duration;
   determining that a difference between the first timestamp and a second timestamp associated with the communications session is less than the predefined time duration; and
   determining that the first data is to be overridden based at least in part on the difference.

17. The method of claim 14, further comprising:
   determining a user identifier and a device identifier based at least in part on the first user account, wherein the first data is determined based at least in part on a first association between the device identifier and the first data in a device profile, wherein the second data is determined based at least in part on the first association and on a second association between the user identifier and the second data; and
   determining that the first data is to be overridden based at least in part on the second association.

18. The method of claim 17, further comprising:
   determining a second device identifier based at least in part on the first user account, the second device identifier associated with a second user device; and
   sending, to the second user device and based at least in part on the second association, third data about outputting a second notification about the communications session.

19. The method of claim 17, further comprising:
   determining that the first user account and a second user account are associated with a group account;
   determining that third data is associated with the second user account, the third data indicating that a second notification about the communications session is to be presented within the period of time;
   determining a second device identifier based at least in part on the second user account, the second device identifier associated with a second user device; and
   sending, to the second user device and based at least in part on the third data, fourth data about outputting the second notification.

20. The method of claim 14, further comprising:
   indicating, based at least in part on user input data, in association with a contacts list that communications from another user device is to override the first data, the contacts list associated with the first user account; and
   determining a match between the second request and the contacts list, wherein the second data is determined based at least in part on the match.

* * * * *